(12) United States Patent
Mashitani et al.

(10) Patent No.: US 10,817,975 B2
(45) Date of Patent: Oct. 27, 2020

(54) IMAGE DISPLAY DEVICE INCLUDING FIRST AND SECOND INPUT UNITS, MEMORIES, WRITING UNITS, AND READING UNITS, AND AN INTERPOLATION UNIT THAT COMBINES IMAGE SIGNALS READ BY THE READING UNITS FROM THE MEMORY UNITS

(71) Applicant: Panasonic Intellectual Property Management Co., Ltd., Osaka (JP)

(72) Inventors: Ken Mashitani, Osaka (JP); Ryuji Fuchikami, Fukuoka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 26 days.

(21) Appl. No.: 16/200,841

(22) Filed: Nov. 27, 2018

(65) Prior Publication Data
US 2019/0164252 A1   May 30, 2019

(30) Foreign Application Priority Data
Nov. 30, 2017 (JP) ................. 2017-231011

(51) Int. Cl.
*G06T 1/60* (2006.01)
*G09G 5/37* (2006.01)
(Continued)

(52) U.S. Cl.
CPC ............. *G06T 1/60* (2013.01); *G06T 5/006* (2013.01); *G09G 5/37* (2013.01); *G09G 5/397* (2013.01); *G09G 5/399* (2013.01); *G09G 2310/04* (2013.01); *G09G 2340/125* (2013.01); *G09G 2354/00* (2013.01); *G09G 2360/127* (2013.01);
(Continued)

(58) Field of Classification Search
CPC ....... G06T 1/60; G06T 5/006; G09G 2310/04; G09G 2340/125; G09G 2352/00; G09G 2360/127; G09G 2360/18
See application file for complete search history.

(56) References Cited

U.S. PATENT DOCUMENTS 6,151,075 A * 11/2000 Shin ..................... H04N 7/0112
                                                        348/441
6,161,169 A * 12/2000 Cheng .................. G06F 3/0613
                                                        711/150

FOREIGN PATENT DOCUMENTS

JP    2001-215941    8/2001
JP    2004-94523     3/2004
(Continued)

OTHER PUBLICATIONS

Cummings, Clifford E. , "Simulation and Synthesis Techniques for Asynchronous FIFO Design", SNUG San Jose 2002 (Year: 2002).*

*Primary Examiner* — Michelle L Sams
(74) *Attorney, Agent, or Firm* — Wenderoth, Lind & Ponack, L.L.P.

(57) ABSTRACT

An image display device includes an image input unit into which an image signal from an image signal source is input; a memory; a writing unit that writes at a first frequency an image signal input into the image input unit into the memory; a reading unit that reads at a second frequency higher than the first frequency an image signal written in the memory; an image output unit that outputs an image signal read by the reading unit to a display unit; and an image interpolation unit that interpolates an image to be output to the display unit.

8 Claims, 17 Drawing Sheets

(51) Int. Cl.
  *G06T 5/00* (2006.01)
  *G09G 5/397* (2006.01)
  *G09G 5/399* (2006.01)
(52) U.S. Cl.
  CPC ..... *G09G 2360/18* (2013.01); *G09G 2380/10* (2013.01); *G09G 2380/12* (2013.01)

(56) References Cited

FOREIGN PATENT DOCUMENTS

| | | | |
|---|---|---|---|
| JP | 2004094523 A | * | 3/2004 |
| JP | 2015-5936 | | 1/2015 |

* cited by examiner

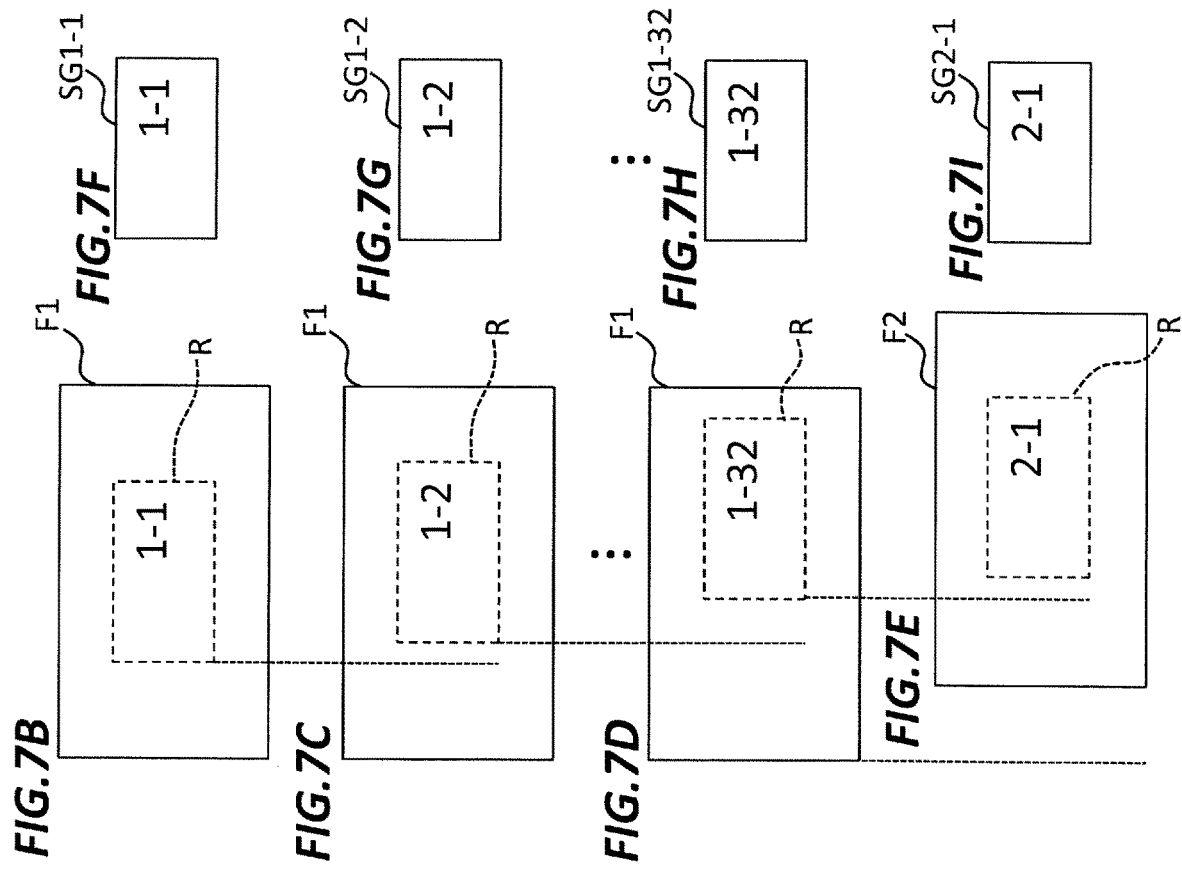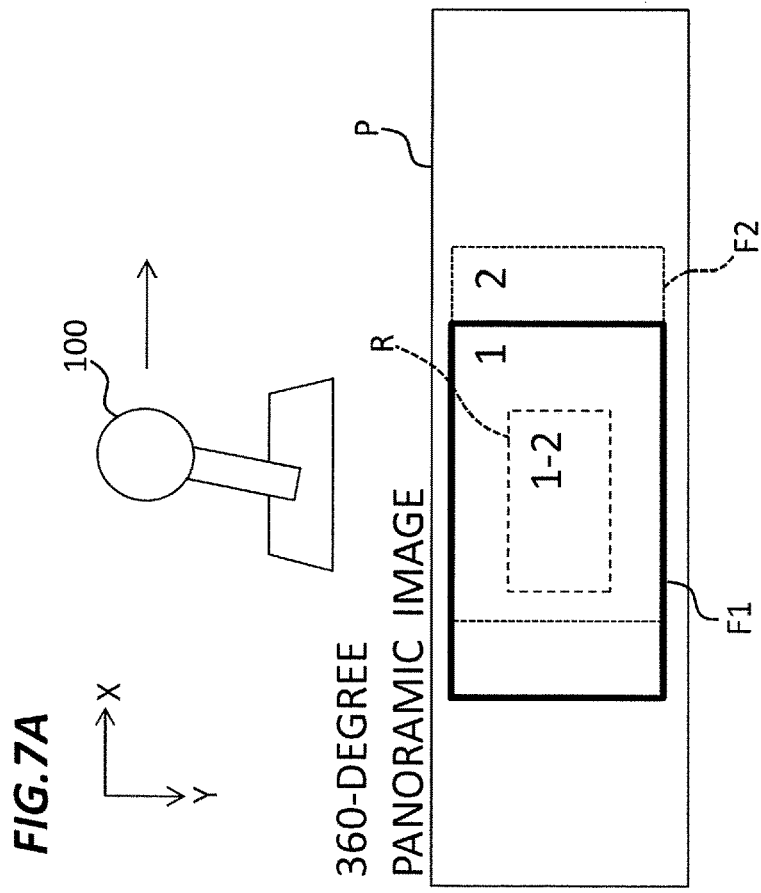

IMAGE OF BALL FOR 32 SUB-FRAMES : 60fps

BACKGROUND MOVING IMAGE : 60fps

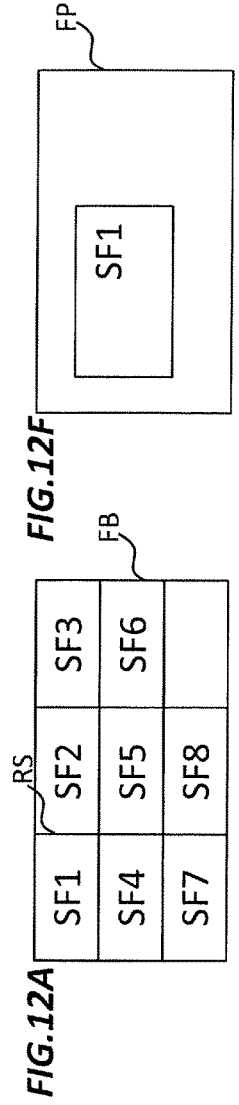

FIG.13A, FIG.13B, FIG.13C, FIG.13D, FIG.13E, FIG.13F, FIG.13G, FIG.13H, FIG.13I

IMAGE OF BALL FOR 32 SUB-FRAMES : 60fps

IMAGE DISPLAY DEVICE INCLUDING FIRST AND SECOND INPUT UNITS, MEMORIES, WRITING UNITS, AND READING UNITS, AND AN INTERPOLATION UNIT THAT COMBINES IMAGE SIGNALS READ BY THE READING UNITS FROM THE MEMORY UNITS

CROSS REFERENCE TO RELATED APPLICATIONS

This application claims priority to Japanese Patent Application No. 2017-231011 filed on Nov. 30, 2017, the entire contents of which are incorporated herein by reference.

TECHNICAL FIELD

The present disclosure relates to an image display device such as a projector.

BACKGROUND

There is a method of cutting out a partial region from a panoramic image according to the operation of the controller while generating and updating the panoramic image to display the image on the image display device (See, for example, JP 2004-94523 A). In this method, in uses such as simulators, a view seen through a windshield of a vehicle, a view seen through a cockpit window of an airplane, and the like are cut out as cut-out images with respect to panoramic images. According to this method, the cut-out region of the image is changed with the operation of the controller, and the user is caused to have a bodily sensation that the travelling direction changes.

Patent Document 1: Japanese Laid-Open Patent Publication No. 2004-94523.

The present disclosure provides an image display device that speeds up image processing and smoothly displays an image.

SUMMARY OF THE INVENTION

The image display device of the present disclosure includes: an image input unit into which an image signal from an image signal source is input; a memory; a writing unit configured to write at a first frequency an image signal input into the image input unit into the memory; a reading unit configured to read at a second frequency higher than the first frequency an image signal written in the memory; an image output unit configured to output an image signal read by the reading unit to a display unit; and an image interpolation unit configured to interpolate an image to be output to the display unit.

The image display device of the present disclosure speeds up image processing and smoothly displays images.

BRIEF DESCRIPTION OF DRAWINGS

FIGS. 7A to 7I are diagrams for illustrating a change in an image cut-out region according to a modified example of the second embodiment;

FIGS. 12A to 12J are diagrams for illustrating reading of an image from a memory and image synthesis in the third embodiment;

FIGS. 13A to 13I are diagrams for illustrating writing of an image into a memory and reading of an image from a memory in a modified example of the third embodiment;

DETAILED DESCRIPTION OF PREFERRED EMBODIMENT

In the following, embodiments will be described in detail with reference to the drawings as appropriate. However, a detailed description more than necessary may be omitted. For example, a detailed description of already well-known matters and an overlapping description for substantially the same configuration may be omitted. This is to avoid the unnecessary redundancy of the following description and to facilitate understanding by those skilled in the art.

It should be noted that the inventor(s) provides (provide) the accompanying drawings and the following description for a person skilled in the art to fully understand the present disclosure. Thus, the drawings and the description are not intended to limit the subject matter defined in the claims.

First Embodiment

1. Configuration
1.1 Overall Configuration

Figure 1:
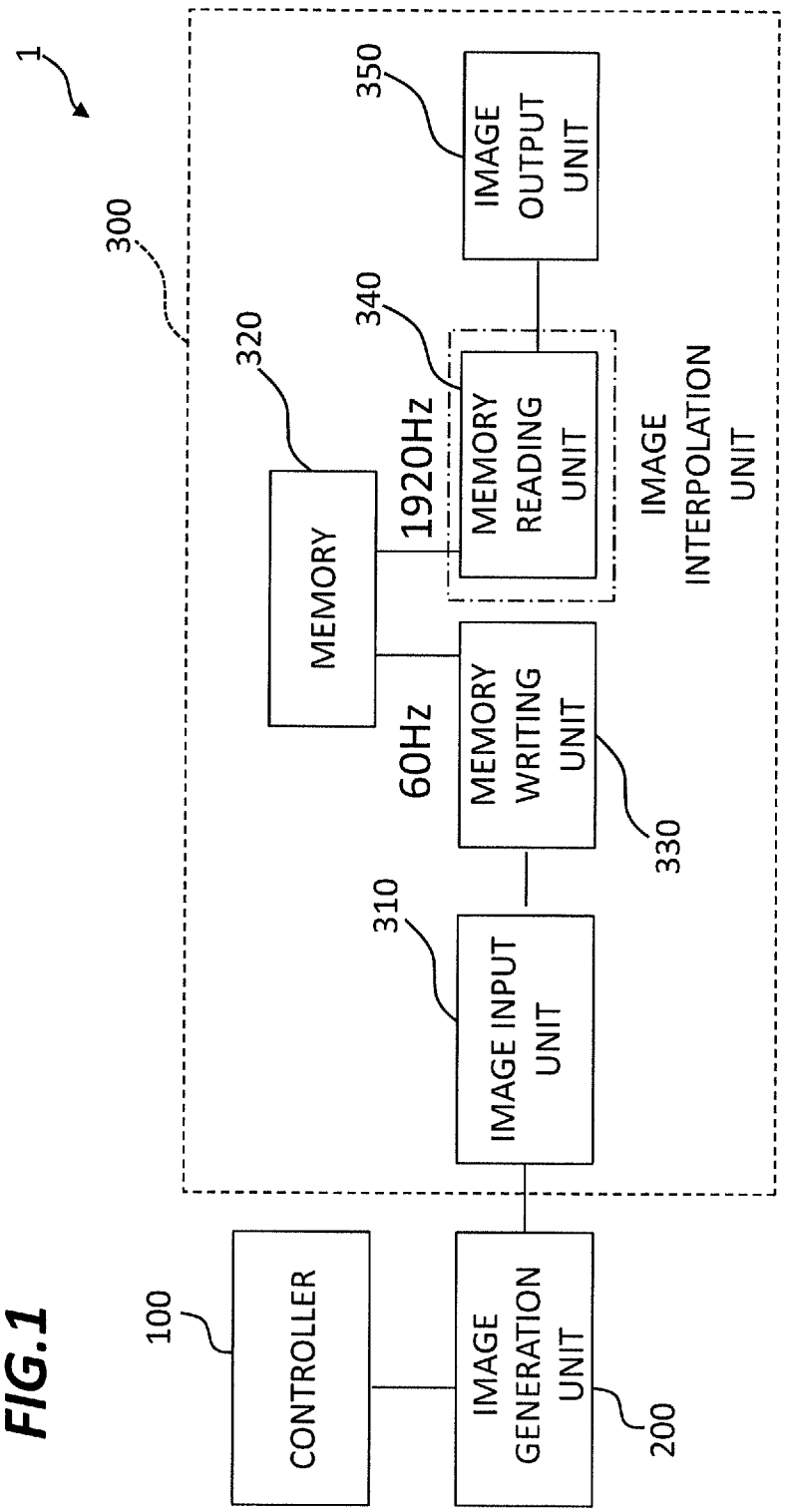
FIG. 1 is a block diagram showing an image display system according to a first embodiment.

An image display device of the present disclosure will be described with reference to FIGS. 1 and 2A to 2I. FIG. 1 is a block diagram showing an image display system according to a first embodiment. FIGS. 2A to 2I are diagrams for illustrating an image writing operation and a reading operation according to the first embodiment.

As shown in FIG. 1, the image display system 1 in the present embodiment includes a controller 100, an image generation unit 200, and an image display device 300. The controller 100 is an operation unit for instructing, for example, to move a viewpoint of an image displayed on an image display unit such as a screen (not shown).

The image generation unit 200 is an example of an image signal source and has a function of generating a moving image at a predetermined frame rate as an image to output the moving image as an image signal. In the present embodiment, as an example, the image generation unit 200 generates a moving image at 60 fps. The moving image generated by the image generation unit 200 may be a moving image obtained by editing and processing a captured moving image or may be computer graphics (CG). In the present embodiment, as an example, the image generation unit 200 is configured with a personal computer. The image generation unit 200 generates a moving image in which the viewpoint is moved according to the operation amount of the controller 100.

The image display device 300 includes an image input unit 310, a memory 320, a memory writing unit 330, a memory reading unit 340, and an image output unit 350. The image display device 300 may be configured with a field-programmable gate array (FGPA), or may be configured with a CPU and software.

Configuration of Image Display Device

The image input unit 310 has a function of inputting a moving image generated by the image generation unit 200 as an image signal. Connection between the image generation unit 200 and the image input unit 310 is performed by using an HDMI (registered trademark) cable, a USB cable, or both of them.

In the present embodiment, the memory 320 includes a single buffer with only one frame buffer. Therefore, data can be written into the memory 320 and data can be read from the memory 320 at the same time. The memory writing unit 330 has a function of writing the moving image input into the image input unit 310 into the memory 320 at a frequency of 60 Hz being the first frequency for each frame.

The memory reading unit 340 has a function of reading the frame image written in the memory 320 at 1920 Hz being the second frequency higher than the first frequency during the writing operation of the memory writing unit 330 into the memory 320, that is, asynchronously.

The image output unit 350 has a function of outputting the frame image read by the memory reading unit 340 and outputs an image to the image display unit. Thus, the moving image is displayed on the image display unit.

2. Operation

Normally, image reading is performed after the image writing operation is completed. For this reason, a delay of $\frac{1}{60}$ second occurs in the moving image to be output with respect to the input moving image. On the other hand, in the present embodiment, since the memory reading unit 340 reads the image asynchronously with the writing operation of the image without waiting for the completion of the writing of the one frame image into the memory 320, the delay of the moving image output from the image output unit 350 hardly occurs with respect to the moving image input into the image input unit 310.

However, reading the image written in the memory 320 during the writing operation reads an image in which the image of the previous frame and the image of the frame being written are mixed. Normally, displaying such an image in a video with motion causes a boundary line between different frame images to be visually recognized on the output moving image, which adversely affects the image quality.

Therefore, in the present embodiment, setting the reading frequency from the memory 320 performed by the memory reading unit 340 sufficiently higher than the writing frequency performed by the memory writing unit 330 prevents the boundary line from being visually recognized. Thus, in the present embodiment, the memory reading unit 340 functions as an image interpolation unit that interpolates an image to be output to the image display unit, as indicated by a rectangular frame in an alternate long and short dash line in FIG. 1.

FIGS. 2A to 2I show a mechanism for preventing the boundary line from being visually recognized. FIGS. 2A to 2I are an example showing the transition of a frame image F output from the image output unit 350 at 1920 Hz. The moving image input to the image input unit 310 has a resolution of 1920×1080 and is a moving image in which a rectangular object S moves in the right direction in accordance with the operation of the controller 100. The frame image F is rewritten in order from top to bottom. Specifically, it is assumed that the pixel coordinates at the upper left of the frame image are the origin (0, 0), the right direction is the X axis, and the downward direction is the Y axis, and the image information on the first line is rewritten from the origin in the positive direction of the X axis, and then the image information on each line is rewritten sequentially in the positive direction of the Y axis.

Since the frequency of the moving image input into the image input unit 310 is 60 Hz and the reading frequency of the image in the memory reading unit 340 is 1920 Hz, the memory reading unit 340 reads one frame of the moving image input into the image input unit 310 32 times. That is, the whole image is completely rewritten one time with 32 times of reading. Therefore, an image in which rewriting of the frame image progresses by an average of 33.75 lines (1080/32) is read for one time of reading. In each of the frame images F in FIGS. 2A to 2I, a plurality of horizontal lines arranged in the Y-axis direction indicate positions every 33.75 lines.

Figure 2:
FIGS. 2A to 2I are diagrams for illustrating an image writing operation and a reading operation according to the first embodiment.

The image in FIG. 2A shows an image in which after writing of one frame of image including the rectangle S into the memory 320 is completed in the previous frame, writing of the image into the memory 320 is completed up to the line just before the rectangle S in the next frame and which is output from the image output unit 350.

The image in FIG. 2B below FIG. 2A shows an image in which the upper 33.75 lines of the rectangle S are rewritten into the image of the next frame and moved to the right and which is output from the image output unit 350. The elapsed time from the image shown in FIG. 2A to the image shown in FIG. 2B is about 0.5 ms ($\frac{1}{1920}$). Similarly, as shown in FIGS. 2C to 2I, an image in which the rectangle S moves by 33.75 lines to the right every about 0.5 ms is sequentially output from the image output section 350. Here, focusing on regions above and below the boundary line between different frame images, in the present embodiment, after 0.5 ms from the state where the misalignment occurs in the left and right, a display with no misalignment is obtained.

If the reading frequency is sufficiently higher than the writing frequency, and the transition time from the state where misalignment occurs to the non-misaligned state is short, the boundary line between different frame images cannot be visually recognized. As a guideline of the transition time, for example, it has been reported that the delay of drawing a line with respect to the movement of a finger on a touch panel such as a tablet can be visually recognized at 10 ms and cannot be visually recognized at 1 ms (https://www.microsoft.com/en-us/research/video/applied-sciences-group-high-performance-touch/). 0.5 ms is even shorter than this 1 ms.

In terms of the frequency of moving images, with respect to the finger movement, the misalignment will be recognized with drawing at 100 Hz, but the misalignment will not be recognized with drawing at 1000 Hz. When movement of fingers and movement of drawing are replaced with the regions above and below the boundary line between different frame images, it is visually recognized that the drawing is delayed to move in the image output from the image output unit 350 when an image is read at a frequency of 100 Hz, but it is not visually recognized that the drawing is delayed to move in the image output from the image output unit 350 when an image is read at a frequency of 1000 Hz. From this, as a guideline of the frequency at which the delay becomes less conspicuous, it is considered to be around 500 Hz in the vicinity of the center of the two frequencies.

Incidentally, as described above, since the frequency of the moving image input into the image input unit 310 is 60 Hz and the reading frequency of the image in the memory reading unit 340 is 1920 Hz, the reading operation is performed 32 times for one frame of the input moving image. At the first time of the 32 times, the image may be read from the memory 320 in synchronization with the start of the writing operation of the input image into the memory 320. In this case, for the remaining 31 times, it is preferable that the image is read from the memory 320 by the memory reading unit 340 at the time interval obtained by dividing the time of one frame into 32 equal parts.

In addition, the image reading frequency 1920 Hz in the memory reading unit 340 of the present embodiment is an integer multiple of the frequency 60 Hz of the moving image input into the image input unit 310, but the image reading frequency does not need to be an integer multiple, and for example, may be 1930 Hz or 1950 Hz.

3. Effects and the Like

The image display device 300 of the present disclosure includes: an image input unit 310 into which an image signal from the image generation unit 200 is input as an image signal source, a memory 320, a memory writing unit 330 for writing the image signal input into the image input unit 310 into the memory 320 at 60 Hz as an example of a first frequency, a memory reading unit 340 for reading the image signal written into the memory 320 at 1920 Hz as an example of a second frequency higher than the first frequency, an image output unit 350 for outputting the image signal read by the memory reading unit 340 to the image display unit, and a memory reading unit 340 as an image interpolation unit for interpolating the image to be output to the image display unit. As a result, for example, when the controller 100 performs an operation to change the viewpoint position of the moving image, the update of the moving image corresponding to this operation is performed in the image generation unit 200, and the updated moving image is input into the image input unit 310. Even in this case, according to the present embodiment, the delay from the operation of the controller 100 to the display of the moving image corresponding to this operation can be reduced to a minimum.

Second Embodiment

1. Configuration
1.1 Overall Configuration

Figure 3:
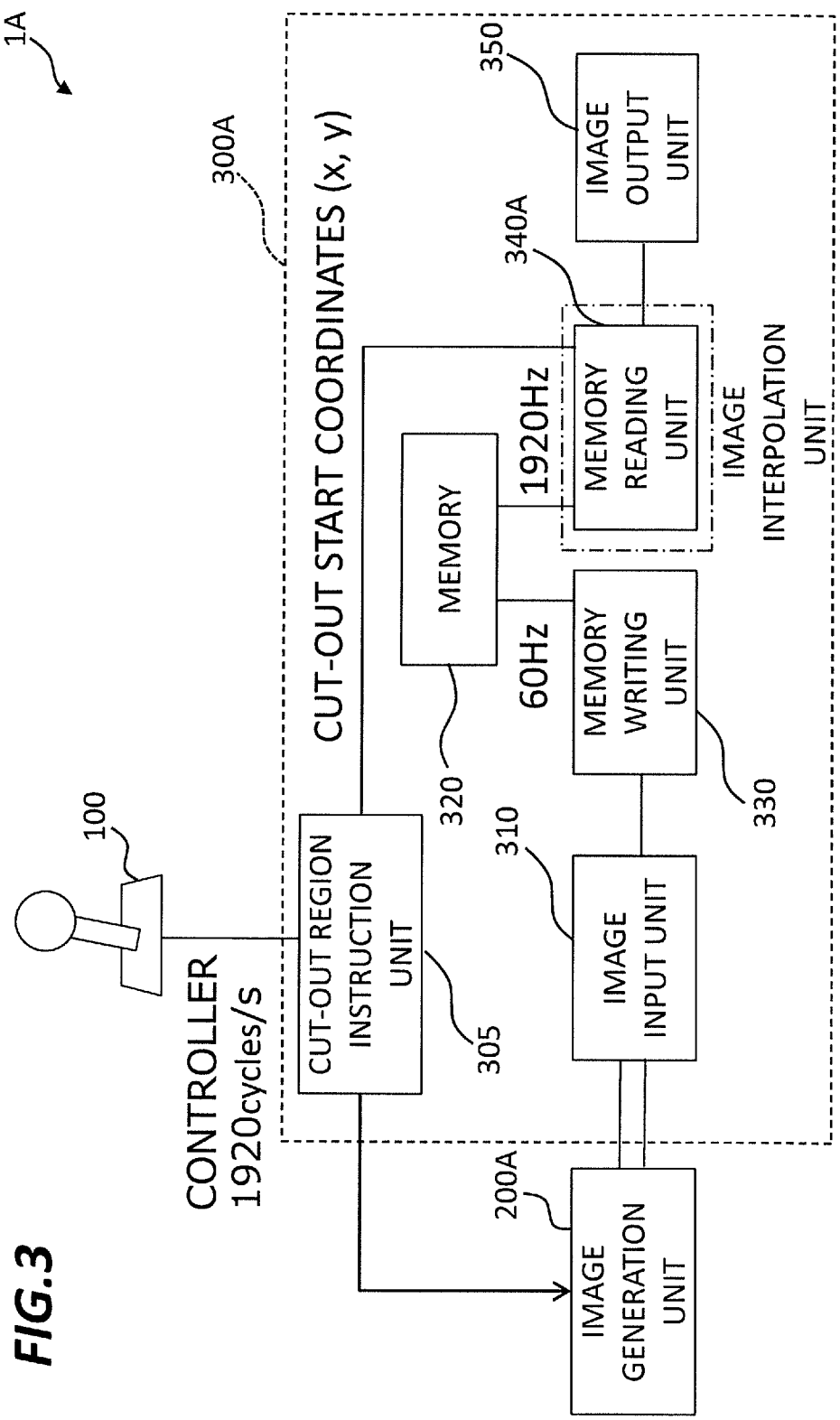
FIG. 3 is a block diagram showing an image display system according to a second embodiment.
Figure 4:
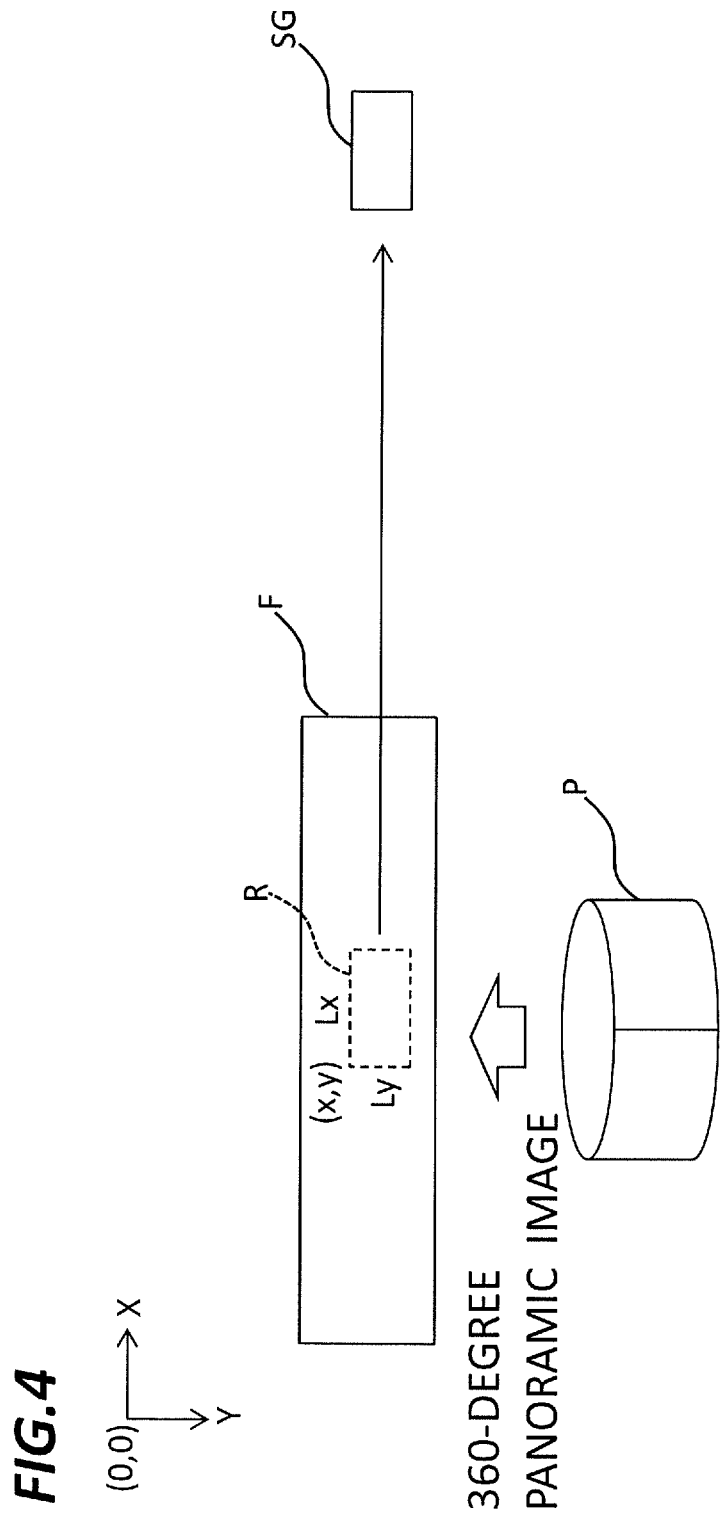
FIG. 4 is a block diagram showing an image display system according to the second embodiment.

The second embodiment in the image display device of the present disclosure will be described with reference to FIGS. 3 and 4. FIG. 3 is a block diagram showing an image display system according to a second embodiment. FIG. 4 is a diagram for illustrating the relationship between the cut-out start coordinates and cut-out region for one frame image of the 360-degree panoramic moving image and the cut-out image corresponding to the cut-out region.

As shown in FIGS. 2A to 2I, the image display system 1A according to the present embodiment is, as an example, a system used for a driving simulator or a flight simulator for training a driving technique or a piloting technique. As shown in FIG. 3, the image display system 1A includes a controller 100, an image generation unit 200, and an image display device 300A.

The controller 100 is an operation unit related to driving, piloting, or the like in the simulator, and for example, a steering wheel, an accelerator, a brake, or the like in the driving simulator corresponds to the controller 100. In addition, the controller 100 may be a joystick, a jog dial, or a gyro sensor.

The image generation unit 200 has a function of generating a moving image at a predetermined frame rate to output the moving image as an image signal. In the present embodiment as well, the image generation unit 200 generates a moving image of 60 fps as an example. The moving image generated by the image generation unit 200 may be a moving image obtained by editing and processing a captured moving image or may be computer graphics (CG). In the present embodiment, as an example, the image generation unit 200 is configured with a personal computer. The image generation unit 200 in the present embodiment generates a moving image equivalent to a view visible through a windshield such as a vehicle or an airplane. This moving image is a 360-degree panoramic moving image ranging over 360 degrees in the horizontal direction.

In the present embodiment, the image generation unit 200A is connected to a cut-out region instruction unit 305 to be described below. The image generation unit 200A is configured to input instructions relating to speed or acceleration, such as acceleration, deceleration, stop, or cruising speed, according to the operation of the accelerator or the brake output from the cut-out region instruction unit 305. When instructions relating to speed or acceleration are input from the cut-out region instruction unit 305, the image generation unit 200A generates a 360-degree panoramic moving image according to the speed or the acceleration.

1.2 Configuration of Image Display Device

The image display device 300A includes a cut-out region instruction unit 305, an image input unit 310, a memory 320, a memory writing unit 330, a memory reading unit 340A, and an image output unit 350. Of the image display device 300A, the image input unit 310, the memory 320, the memory writing unit 330, the memory reading unit 340, and the image output unit 350 may be configured with an FGPA, or may be configured with a CPU and software.

The image input unit 310 has a function of inputting a 360-degree panoramic moving image generated by the image generation unit 200A as an image signal. Connection between the image generation unit 200A and the image input unit 310 is performed by using an HDMI cable, a USB cable, or both of them.

In the present embodiment, the memory 320 includes a single buffer with only one frame buffer. However, the memory 320 may include a double buffer including two frame buffers. An example in which a double buffer memory is used as the memory 320 will be described below.

The memory writing unit 330 has a function of writing the 360-degree panoramic moving image input into the image input unit 310 into the memory 320 at a frequency of 60 Hz being the first frequency for each frame.

The memory reading unit 340A has a function of reading the frame image written in the memory 320 at 1920 Hz being the second frequency higher than the first frequency during the writing operation of the memory writing unit 330 into the memory 320, that is, asynchronously. In the present embodiment, the memory reading unit 340A is connected to the cut-out region instruction unit 305. The memory reading unit 340A reads the frame image corresponding to the cut-out region at 1920 Hz based on the cut-out start coordinates output from the cut-out region instruction unit 305. The details of the cut-out start coordinates and the cut-out region will be described below.

The image output unit 350 has a function of outputting a frame image corresponding to the cut-out region read by the memory reading unit 340 and outputs an image to the image display unit. Thus, a moving image corresponding to the cut-out region is displayed on the image display unit.

The cut-out region instruction unit 305 is connected to the controller 100, and detects the operation amount, the operation angle, and the like of the controller 100 in 1920 cycles per second when a steering wheel, a joystick, or the like is used as the controller 100. The cut-out region instruction unit 305 is also connected to the image generation unit 200A, and outputs information relating to the speed, acceleration, or the like according to the detected operation amount of the controller 100 to the image generation unit 200A. The cut-out region instruction unit 305 is further connected to the memory reading unit 340A, and outputs cut-out start coordinates corresponding to the detected operation angle or the like of the controller 100 to the memory reading unit 340A.

When a gyroscope sensor is used as the controller 100, the cut-out region instruction unit 305 detects the rotation amount and the rotation direction of the controller 100 in 1920 cycles per second. The cut-out region instruction unit 305 outputs information relating to the speed, acceleration, or the like corresponding to the detected rotation amount of the controller 100 to the image generation unit 200A. The cut-out region instruction unit 305 outputs cut-out start coordinates corresponding to the detected rotation direction of the controller 100 to the memory reading unit 340A.

2. Operation

FIG. 4 is a diagram for illustrating the relationship between the cut-out start coordinates and cut-out region for one frame image of the 360-degree panoramic moving image and the cut-out image corresponding to the cut-out region. As shown in FIG. 4, one frame of image F of the 360-degree panoramic moving image P input into the image input unit 310 is written into the memory 320 by the memory writing unit 330.

The cut-out region R has a length Lx in the X-axis direction and a width Ly in the Y-axis direction from the cut-out start coordinates (x, y). The size of the cut-out region R corresponds to the angle of view seen from a windshield of a vehicle, an airplane, or the like.

In the initial state such as at the startup of the image display system 1A, the cut-out start coordinates (x, y) are set to predetermined coordinates. When the operator operates the controller 100, the operation angle and the like thereof are detected by the cut-out region instruction unit 305 at a frequency of 1920 Hz, and cut-out start coordinates corresponding to the operation angle and the like are output to the memory reading unit 340A.

The memory reading unit 340A reads an image corresponding to the cut-out region R at a frequency of 1920 Hz based on the cut-out start coordinates output from the cut-out region instruction unit 305. The image read by the memory reading unit 340A is output from the image output unit 350 and displayed on the image display unit as a cut-out image SG. In the present embodiment, setting the reading frequency from the memory 320 performed by the memory reading unit 340A sufficiently higher than the writing frequency performed by the memory writing unit 330 performs interpolation so that the cut-out image SG is displayed in response to the operation of the controller 100 without delay. As described above, in the present embodiment, the memory reading unit 340 functions as an image interpolation unit that interpolates the image to be output to the image display unit, as indicated by a rectangular frame in a dashed line in FIG. 3.

3. Effects and the Like

The image display device 300A of the present disclosure includes: an image input unit 310 into which an image signal from the image generation unit 200A is input as an image signal source, a memory 320, a memory writing unit 330 for writing the image signal input into the image input unit 310 into the memory 320 at 60 Hz as an example of a first frequency, a memory reading unit 340A for reading the image signal written into the memory 320 at 1920 Hz as an example of a second frequency higher than the first frequency, an image output unit 350 for outputting the image signal read by the memory reading unit 340A to the image display unit, and a memory reading unit 340A as an image interpolation unit for interpolating the image to be output to the image display unit. In addition, the image display device 300A includes a controller 100, and the memory reading unit 340A reads the image signal written into the memory 320 for each cut-out region RS according to the operation of the controller 100. As a result, the operation angle of the controller 100 and the like are detected at a frequency of 1920 Hz, and based on the cut-out start coordinates according to the detected operation angle and the like, the image corresponding to the cut-out region R of the input images at a frame rate of 60 fps is read at a frequency of 1920 Hz to be output. Therefore, when the cut-out start coordinates are changed by the operation of the controller 100, it is possible to smoothly display moving images with different cut-out start coordinates in response to the operation of the controller 100 without delay.

For example, when the controller 100 is a steering wheel of a vehicle or the like, cut-out start coordinates are updated depending on the direction in which the steering wheel is turned, and a moving image depending on the direction in which the steering wheel is turned is displayed in response to the operation of turning the steering wheel without delay.

In addition, when the reading frequency performed by the memory reading unit 340A is 60 Hz, the change in the cut-out region R displayed on the image display unit is felt intermittently. However, as in the present embodiment, when the reading frequency performed by the memory reading unit 340A is 1920 Hz, there is also an advantage that the cut-out region R is seen to change smoothly on the image display unit. As described above, according to the present embodiment, the delay from the operation of the controller 100 to the display of the moving image can be reduced to a minimum. It should be noted that from the viewpoint of movement of the cut-out region R with respect to the operation of the controller 100, the guideline of the reading frequency for making the delay less conspicuous performed by the memory reading unit 340A is considered to be about 500 Hz as in the first embodiment.

It should be noted that when the image display system 1A according to the present embodiment is applied to a driving simulator, since the operation of the controller 100 is only in the horizontal direction, only the X coordinate can be used as the cut-out start coordinate. In addition, the height of the panoramic image may be made larger than the height of the image display unit, and the coordinate in the Y direction may also be changed in consideration of the unevenness and inclination of the road.

4. Modified Example of Second Embodiment 4.1 Overall Configuration

Figure 5:
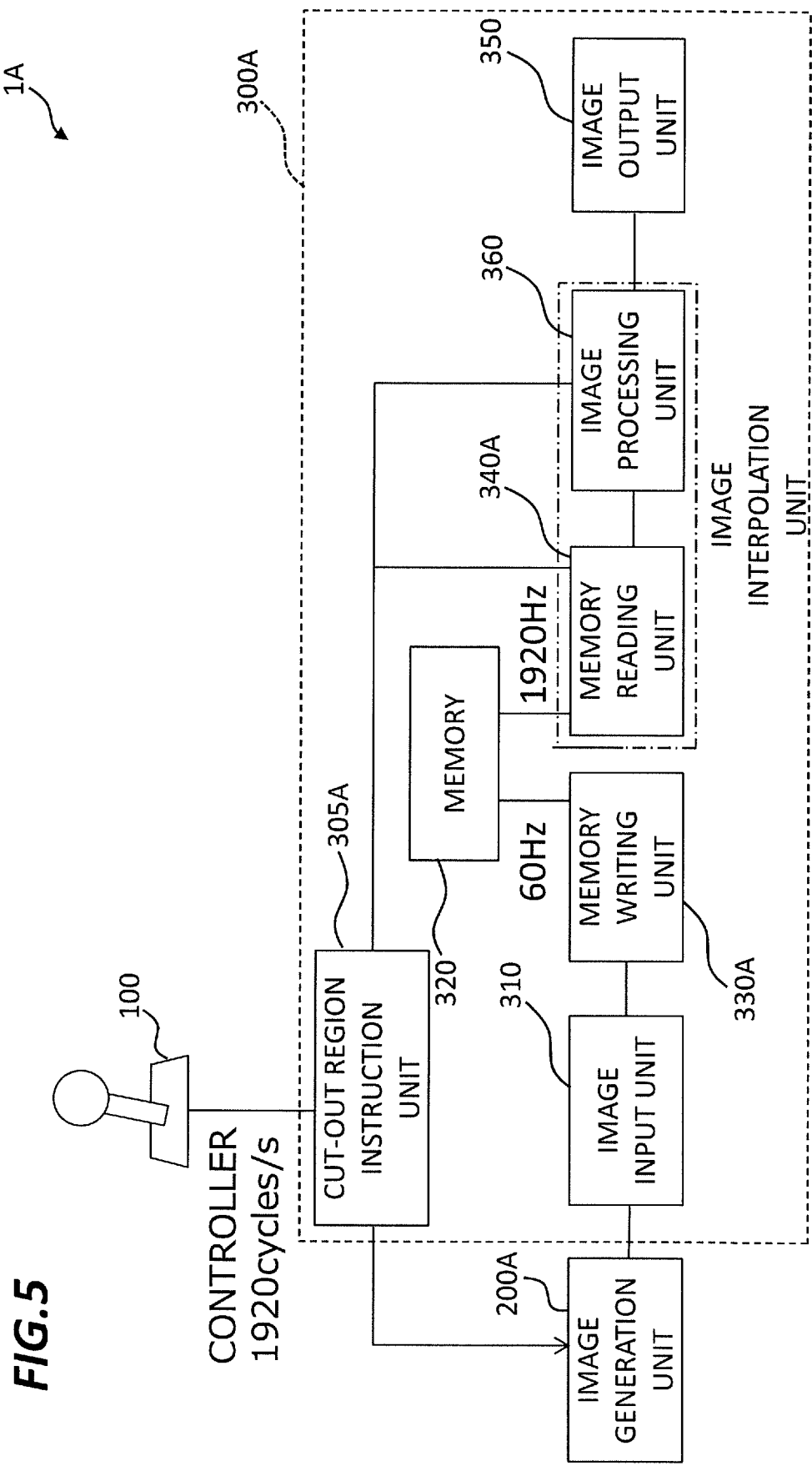
FIG. 5 is a block diagram showing an image display system according to a modified example of the second embodiment.

A modified example of the second embodiment will be described with reference to FIG. 5. FIG. 5 is a block diagram showing an image display system according to a modified example of the second embodiment. The present modified example is a configuration when the viewpoint is freely moved over 360 degrees in a use such as a flight simulator. In the image display system 1A of the present modified example, the image generation unit 200A generates a hemispherical or spherical panoramic moving image. Examples of this panoramic moving image include a Dome Master format moving image for housing a range of 360 degrees horizontally and 90 degrees from the horizon to the head in one image. In addition, other examples include a moving image recorded in an Equirectangular format or the like for housing a range of 360 degrees horizontally, and a range of 180 degrees from the feet to the head in one image.

The updating of the cut-out start coordinates by the operation of the controller 100 is performed for both the X coordinate and the Y coordinate. In addition, as shown in FIG. 5, the image display device 300A includes an image processing unit 360, and the image processing unit 360 is connected to the cut-out region instruction unit 305A and the image output unit 350.

In the modified example shown in FIG. 5, the image written in the memory 320 is an image obtained by converting a frame image of a hemispherical or spherical panoramic moving image as described above into a planar image. Therefore, in this image, the image which should originally be displayed as a rectangle is curved and distortion occurs. Thus, in the modified example shown in FIG. 5, coordination processing is performed between the cut-out start coordinates and the size of the cut-out region R.

The memory writing unit 330 converts one frame of image of the hemispherical or spherical panoramic moving image input by the image generation unit 200A into a planar image and writes the planar image into the memory 320 at a frequency of 60 Hz.

When detecting the operation angle and the like by the controller 100, the cut-out region instruction unit 305A sets the cut-out start coordinates and the size of the cut-out region R according to the distortion, and outputs the set cut-out start coordinates and the size of the cut-out region R to the memory reading unit 340A. In addition, the cut-out region instruction unit 305A outputs the size of the cut-out region R set as described above to the image processing unit 360. The cut-out start coordinates and the size of the cut-out region R set by the cut-out region instruction unit 305A are obtained by inverse conversion processing of the conversion processing for converting a frame image of a Dome Master format moving image or a frame image of an Equirectangular format moving image into a planar image.

When the cut-out start coordinates and the size of the cut-out region R set as described above are input from the cut-out region instruction unit 305, the memory reading unit 340A cuts out an image in the cut-out region R corresponding to the size based on the cut-out start coordinates.

When the size of the cut-out region R set as described above is input from the cut-out region instruction unit 305, the image processing unit 360 removes the distortion of the cut-out image in the cut-out region R cut out by the memory reading unit 340A, and processes the size of the cut-out image into the size displayed on the image display unit.

4.2 Operation

When a hemispherical or spherical panoramic moving image is generated by the image generation unit 200A and input into the image input unit 310, one frame of image of the input hemispherical or spherical panoramic moving image is converted into a planar image by the memory writing unit 330 and written into the memory 320 at a frequency of 60 Hz.

When the operator operates the controller 100, the operation angle and the like thereof are detected by the cut-out region instruction unit 305 at a frequency of 1920 Hz, and according to the operation angle, the cut-out start coordinates and the size of the cut-out region R are set in correspondence with the distortion by the cut-out region instruction unit 305. The cut-out start coordinates and the size of the cut-out region R being set are output to the memory reading unit 340A by the cut-out region instruction unit 305. In addition, the size of the set cut-out region R is output to the image processing unit 360 by the cut-out region instruction unit 305.

Among the planar images written by the memory writing unit 330, the image of the cut-out region R of the size based on the set cut-out start coordinates is cut out at a frequency of 1920 Hz by the memory reading unit 340A.

The distortion in the cut out image is removed by the image processing unit 360, and the size of the cut-out image is processed into a size to be displayed on the image display unit by the image processing unit 360. The image with the distortion removed and the size processed is output from the image output unit 350 and displayed as a cut-out image on the image display unit.

In the present embodiment, setting the reading frequency from the memory 320 performed by the memory reading unit 340A sufficiently higher than the writing frequency performed by the memory writing unit 330A performs interpolation so that the image is output in response to the operation of the controller 100 without delay. In addition, in the present embodiment, the image processing unit 360 removes the distortion and performs interpolation so as to output an image without distortion. As described above, in the present embodiment, the memory reading unit 340A and the image processing unit 360 function as an image interpolation unit that interpolates the image to be output to the image display unit, as indicated by a rectangular frame in a dashed line in FIG. 5.

4.3 Effects and the Like

As described above, in the present modified example, even when the moving image is a hemispherical or spherical panoramic moving image, an image written in the memory 320 at a frequency of 60 Hz by the memory writing unit 330A is read at a frequency of 1920 Hz to be output. Therefore, even when the moving image is a hemispherical or spherical panoramic moving image, when the cut-out start coordinates are changed by the operation of the controller 100, it is possible to smoothly display moving images with different cut-out start coordinates in response to the operation of the controller 100 without delay. In addition, since a frame image of a hemispherical or spherical panoramic moving image is converted into a planar image to be written into the memory 320 and image distortion is removed by the image processing unit 360 as described above, it is possible to display a cut-out image suitable for a hemispherical or spherical panoramic moving image.

5. Another Modified Example of Second Embodiment 5.1 Overall Configuration

Figure 6:
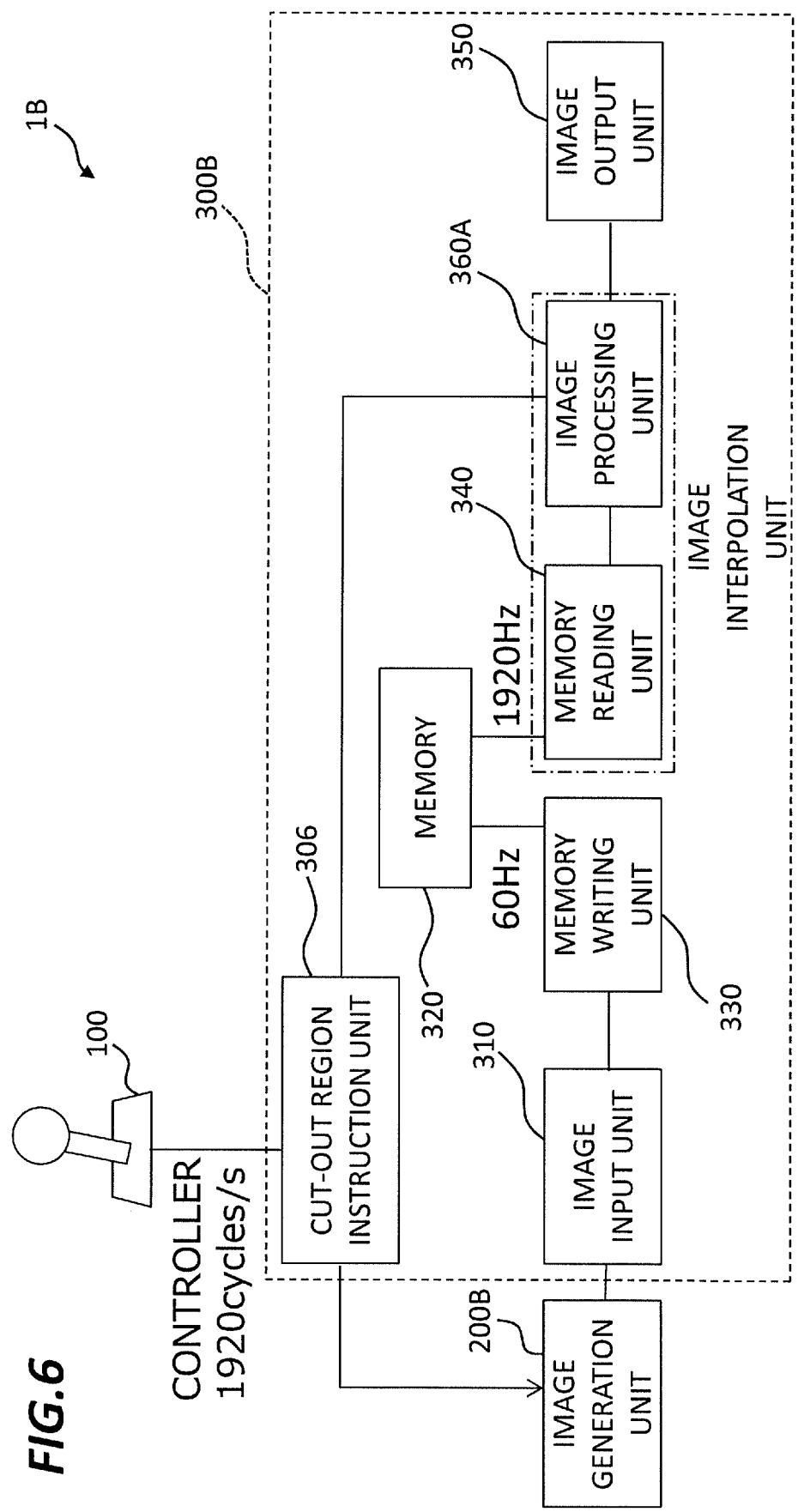
FIG. 6 is a block diagram showing an image display system according to a modified example of the second embodiment.

Another modified example of the second embodiment will be described with reference to FIG. 6. FIG. 6 is a block diagram showing an image display system according to another modified example of the second embodiment. In the image display system 1B of the present modified example, a frame image of a full 360-degree spherical moving image including overhead is used as an image input by the image input unit 310. In addition, the image display unit to which an image is output by the image output unit 350 uses a dome display or a 360-degree (full 360-degree spherical) display, and displays the whole full 360-degree spherical moving image.

In the present modified example, as shown in FIG. 6, the operation angle and the like of the controller 100 are detected by the direction instruction unit 306. The direction instruction unit 306 outputs viewpoint coordinates according to the detected operation angle and the like of the controller 100 to the image generation unit 200B.

The image generation unit 200B generates and outputs a full 360-degree spherical moving image so that the viewpoint coordinates output by the direction instruction unit 306 serve as a predetermined display center position on the image display device.

In the present modified example, the memory reading unit 340B reads the frame image written in the memory 320 at 60 Hz from the memory 320 at 1920 Hz without cutting out the image in response to the operation of the controller 100.

When the viewpoint coordinates output by the direction instruction unit 306 are changed, the image processing unit 360A corrects to remove the distortion of the image so that the image is correctly displayed on the projected surface of the curved surface on the dome display or the 360-degree (full 360-degree spherical) display. In addition, when the dome display or the 360-degree (full 360-degree spherical) display includes a plurality of image display devices (projectors), the image processing unit 360A divides the image read from the memory 320, and performs the processing of processing the divided image into the display size of each image display device or the processing of assigning the image to each image display device.

In the present embodiment, setting the reading frequency from the memory 320 performed by the memory reading unit 340 sufficiently higher than the writing frequency performed by the memory writing unit 330 performs interpolation so that the image is output in response to the operation of the controller 100 without delay. In addition, in the present embodiment, the image processing unit 360 removes the distortion and performs interpolation so as to output an image without distortion. As described above, in the present embodiment, the memory reading unit 340 and the image processing unit 360A function as an image interpolation unit that interpolates the image to be output to the image display unit, as indicated by a rectangular frame in a dashed line in FIG. 6.

5.2 Operation

When the full 360-degree spherical moving image is input into the image input unit 310, one frame of image of the input full 360-degree spherical moving image is written into the memory 320 at a frequency of 60 Hz by the memory writing unit 330.

When the operator operates the controller 100, the operation angle and the like thereof are detected by the direction instruction unit 306 at a frequency of 1920 Hz, and viewpoint coordinates corresponding to the operation angle and the like are output to the image generation unit 200B. In addition, the viewpoint coordinates are output to the image processing unit 360 by the direction instruction unit 306.

The image generation unit 200B generates a full 360-degree spherical moving image so that the viewpoint coordinates output by the direction instruction unit 306 serve as a predetermined display center position on the image display device and outputs a frame image of the full 360-degree spherical moving image to the image input unit 310. The frame image of the full 360-degree spherical moving image input by the image input unit 310 is written into the memory 320 at a frequency of 60 Hz by the memory writing unit 330.

The image written into the memory 320 is read by the memory reading unit 340 at a frequency of 1920 Hz.

The read image is corrected so that distortion is removed by the image processing unit 360A so as to be correctly displayed on the projected surface of the curved surface on the dome display or the 360-degree (full 360-degree spherical) display. In addition, when the dome display or the 360-degree (full 360-degree spherical) display includes a plurality of image display devices (projectors), the image read from the memory 320 is divided by the image processing unit 360A, and the divided image is processed into a display size of each image display device. Alternatively, the divided image is assigned to each image display device by the image processing unit 360A. The image with the distortion removed and the size processed is output from the image output unit 350 and displayed on the image display unit so that the viewpoint coordinates serve as the display center position.

In the present embodiment, setting the reading frequency from the memory 320 performed by the memory reading unit 340 sufficiently higher than the writing frequency performed by the memory writing unit 330 performs interpolation so that the image whose viewpoint position is moved is output in response to the operation of the controller 100 without delay. In addition, in the present embodiment, the image processing unit 360A removes the distortion and performs interpolation so as to output an image without distortion. As described above, in the present embodiment, the memory reading unit 340 and the image processing unit 360A function as an image interpolation unit that interpolates the image to be output to the image display unit, as indicated by a rectangular frame in a dashed line in FIG. 6.

5.3 Effects and the Like

As described above, in the present modified example, even when the whole full 360-degree spherical moving image is displayed, an image written in the memory 320 at a frequency of 60 Hz by the memory writing unit 330A is read at a frequency of 1920 Hz to be output. Therefore, even when the whole full 360-degree spherical moving image is displayed, when the viewpoint coordinates are changed by the operation of the controller 100, it is possible to smoothly display moving images with different display center positions in response to the operation of the controller 100 without delay.

6. Another Modified Example of Second Embodiment 6.1 Overall Configuration

Still another modified example of the second embodiment will be described with reference to FIGS. 7A to 7I. FIGS. 7A to 7I are diagrams showing a relationship between an input image, a cut-out region R of an image, and an output image according to still another modified example of the second embodiment. In the image display system according to the present modified example, an image of a partial region including the traveling direction, not the whole of the 360-degree panoramic image, is used as the image input by the image input unit 310. The present modified example can be applied to the image display system 1A of the second embodiment shown in FIG. 3 and the image display system 1B of the modified example shown in FIG. 5.

There is an upper limit to the change width of the traveling direction in 1/60 second by the operation of the controller 100. Therefore, it is useless to include images of other regions. Therefore, in the present modified example, an image having a size obtained by adding a size larger than the upper limit of the moving amount of the cut-out region R in 1/60 second to the size of the cut-out region R is set as the input video.

FIG. 7A shows a state of the controller 100 and positions of the images of the frames F1 and F2 of the input video with respect to the 360-degree panoramic image P. Since the controller 100 inclines to the right (Y-axis direction shown in FIGS. 7A to 7I), the frame F2 is an image on the right side of the frame F1.

FIGS. 7B to 7E show the positions of the cut-out images R cut out at 1920 Hz from each of the frame images F1 and F2. FIGS. 7F to 7I show the output frame images SG1-1 to SG2-1 output from the image output unit 350. Since the controller 100 inclines to the right, the cut-out region R moves to the right as the frame advances. The cut-out region R of the frame image F1 corresponding to the output frame image SG1-1 is near the center of the frame F1 as shown in FIG. 7B. However, the cut-out region R of the frame image F1 corresponding to the output frame image SG1-32 approaches the edge of the frame F1 as shown in FIG. 7D.

Since the moving speed of the cut-out region R is determined by the use of the image display system, the size of the frame image F1 can be determined in advance so that the output frame image SG1-32 does not protrude from the frame image F1. Then, the frame image F2 is generated in the image generation unit 200A so that the cut-out region R is near the center of the frame image F2 as shown in FIG. 7E to be supplied.

It should be noted that in the present modified example, examples of the image generated in the image generation unit 200A include a 360-degree panoramic image, and may include a 360-degree panoramic image such as a Dome Master format or an Equirectangular format.

6.2 Operation

The image generation unit 200A cuts out the frame image F1 being an image of a partial region from the whole of the 360-degree panoramic image P and outputs the frame image F1 to the image display device 300A. The image input unit 310 of the image display device 300A inputs the frame image F1, and the memory writing unit 330 writes the input frame image F1 into the memory 320 at a frequency of 60 Hz. When the controller 100 is operated, the image generation unit 200A shifts the cut-out position of the frame image according to the operation of the controller 100. For example, as shown in FIG. 7A, a frame image F2 shifted on the right side (Y-axis direction) of the frame image F1 is cut out and output to the image display device 300A. From the frame image F1 and the frame image F2 written in the memory 320, the memory reading unit 340A cuts out the image of the cut-out region R at a frequency of 1920 Hz. The image of the cut-out region R is output from the image output unit 350 and displayed on the image display unit as shown from the output frame image SG1-1 to the output frame image SG2-1. It should be noted that when the present modified example is applied to the image display system 1B of the modified example shown in FIG. 5, the image of the cut-out region R is processed into a size to be displayed on the image display unit by the image processing unit 360. In addition, distortion is removed from the image of the cut-out region R by the image processing unit 360.

6.3 Effects and the Like

As described above, according to the present modified example, it is possible to reduce the data size of the image to be input into the image display device 300A, and it is possible to increase the processing speed. In addition, also in the present modified example, when the cut-out start coordinates are changed by the operation of the controller 100, it is possible to smoothly display moving images with different cut-out start coordinates in response to the operation of the controller 100 without delay.

7. Memory Configuration

Incidentally, in general, reading an image from the memory 320 is faster than writing an image into the memory 320. Therefore, after the writing of an image into the memory 320 is completed, reading of the image from the memory 320 is started. Then, in order to write an image of the next frame into the memory 320 during reading of an image from the memory 320, it is common to adopt a method, referred to as double buffer, including preparing two frame buffers for two frames in the memory 320 and switching between a frame buffer for writing an image and a frame buffer for reading an image for each frame. In the double buffer, the image is held in a frame buffer not written during a period of one frame.

On the other hand, a method of preparing only a frame buffer for one frame in the memory 320 and simultaneously performing reading and writing on the same frame buffer is referred to as a single buffer. In the second embodiment and the modified examples described above, a single buffer method or a double buffer method may be used for memory control. In the case of the double buffer method, the memory 320 has a capacity for two frames. Then, the memory reading unit 340A reads an image from a frame memory not written. As compared with a single buffer method, in the double buffer method, delay occurs in updating a frame of a moving image, but no delay occurs in response to the operation of the controller 100.

Third Embodiment

1. Configuration 1.1 Overall Configuration

Figure 8:
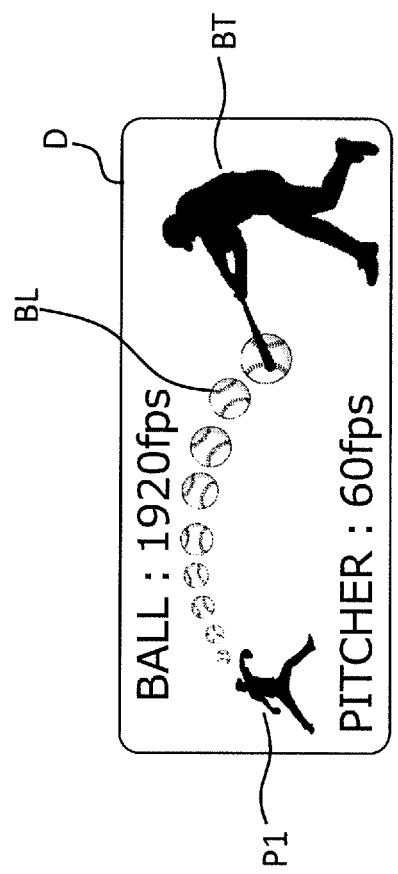
FIG. 8 is a diagram showing an example of an output image in a third embodiment.
Figure 9:
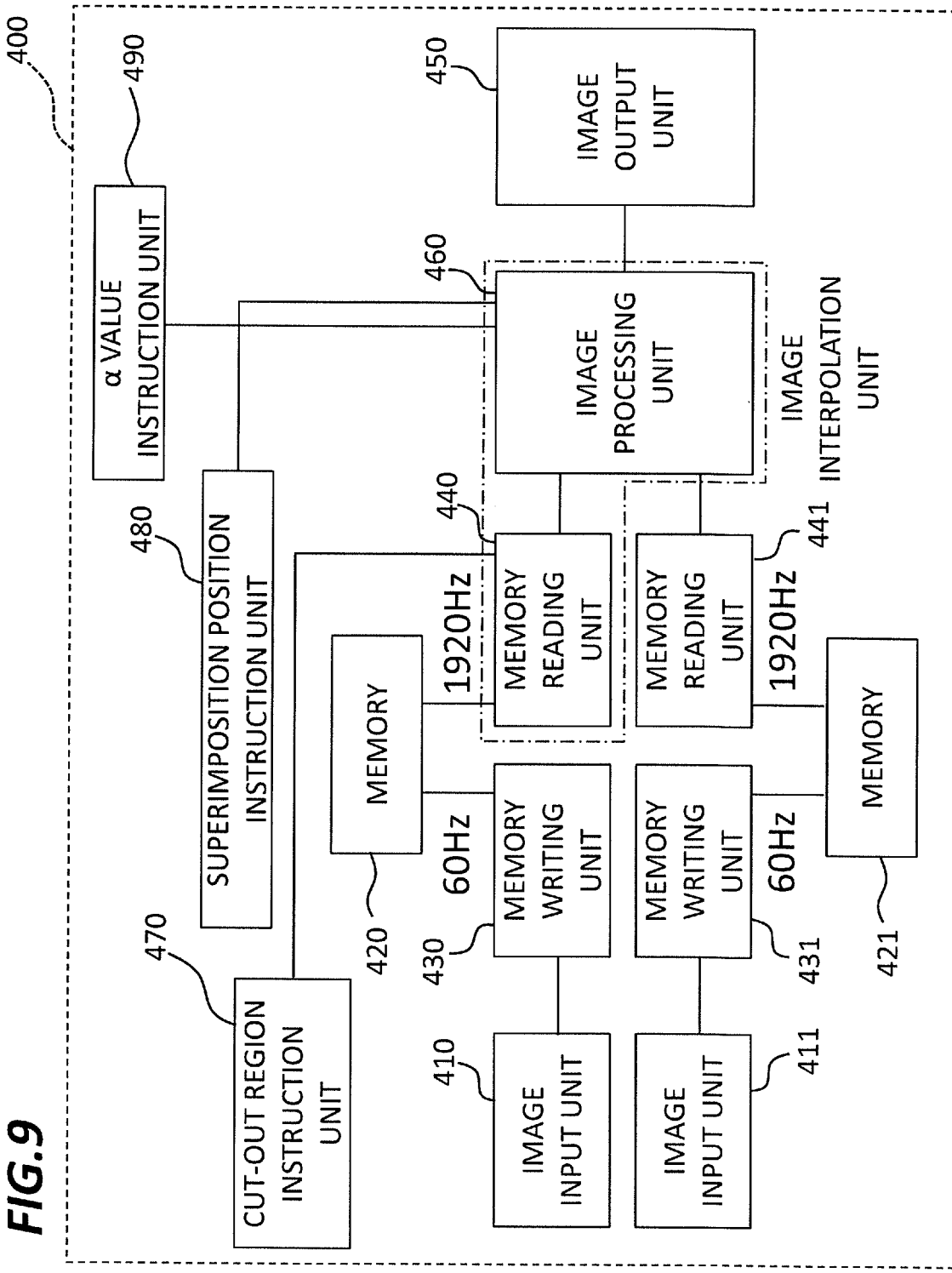
FIG. 9 is a block diagram showing an image display device according to the third embodiment.
Figure 10:
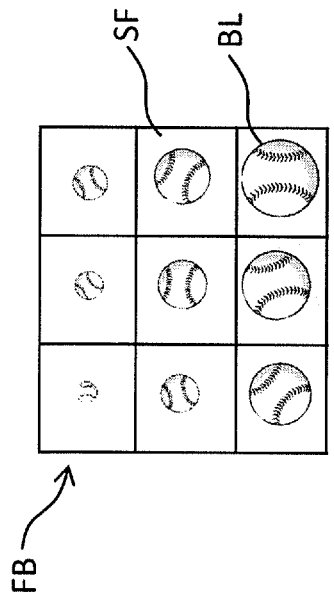
FIG. 10 is a diagram showing sub-frame images of a moving image of a ball in the third embodiment.
Figure 11:
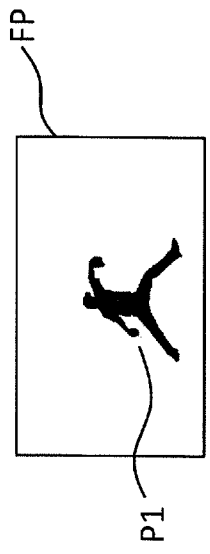
FIG. 11 is a diagram for illustrating a frame image of a background moving image in a memory in the third embodiment.

The third embodiment in the image display device of the present disclosure will be described with reference to FIGS. 8 to 12J. FIG. 8 is a diagram showing an example of an output image displayed on the image display unit in the third embodiment. FIG. 9 is a block diagram showing an image display device according to the third embodiment. FIG. 10 is a diagram for illustrating the arrangement of sub-frame images of a ball in the memory in the third embodiment. FIG. 11 is a diagram for illustrating a frame image of a background moving image in a memory in the third embodiment. FIGS. 12A to 12J are diagrams for illustrating reading of an image from a memory and image composition in the third embodiment.

In the third embodiment, the image display device of the present disclosure is applied to a baseball simulator as an example. As shown in FIG. 8, the output image D displayed on the image display unit includes a background moving image including a moving image of the pitcher P1 and an image of the batter BT, and a moving image of the ball BL.

The moving image of the pitcher P1 is displayed at 60 Hz, and the moving image of the ball BL is displayed at 1920 Hz. It should be noted that when the user views the image as a batter, the batter BT does not need to be displayed.

As shown in FIG. 9, the image display device 400 includes: image input units 410 and 411, memories 420 and 421, memory writing units 430 and 431, memory reading units 440 and 441, an image processing unit 460, an image output unit 450, a cut-out region instruction unit 470, a superimposition position instruction unit 480, and an α value instruction unit 490.

The image display device 400 may be entirely configured with an FGPA, or may be configured with a CPU and software. In addition, in the image display device 400, the cut-out region instruction unit 470, the superimposition position instruction unit 480, and the α value instruction unit 490 may be configured with a personal computer, and the other components may be configured with an FGPA, or a CPU and software.

The image input unit 410 inputs a frame image of a moving image of the ball BL generated and output by the image generation unit (not shown). One frame image of a moving image of a ball includes an image of a ball BL for 32 sub-frames. FIG. 10 is a diagram showing sub-frame images SF of a moving image of a ball. It should be noted that in FIG. 10, for the sake of simplicity, the frame image FB of the ball BL is illustrated with nine sub-frame images SF. As shown in FIG. 10, each sub-frame image SF is an image in which the diameter and rotation state of the ball BL are different. Forming one frame image FB of a moving image of the ball BL with 32 sub-frame images SF allows the states in which the ball BL separates from the hand of the pitcher P1 and gradually approaches the batter BT while rotating to be expressed. Each frame image FB of the ball BL including 32 sub-frame images SF is input into the image input unit 410 at a frame rate of 60 fps.

Connection between the image generation unit and the image input unit 410 is performed by using a USB cable and an HDMI cable. A control signal is output from the image generation unit via the USB cable, and image data is output from the image generation unit via the HDMI cable.

The image input unit 411 inputs a frame image of a background moving image generated by the image generation unit (not shown). As shown in FIG. 11, the frame image FP of the background moving image includes a frame image of the moving image of the pitcher P1 performing the pitching motion. Each frame image FP of the background moving image is input into the image input unit 411 at a frame rate of 60 fps. Connection between the image generation unit and the image input unit 411 is performed by using a USB cable and an HDMI cable. A control signal is output from the image generation unit via the USB cable, and image data is output from the image generation unit via the HDMI cable.

In the present embodiment, the memories 420 and 421 are memories each including a double buffer with two frame buffers. Into the memory 420, a frame image of the ball BL is written. Into the memory 421, a frame image FP of the background moving image including the pitcher P1 is written.

The memory writing unit 430 writes the moving image of the ball BL input into the image input unit 410 into the memory 420 at a frequency of 60 Hz being the first frequency for each one frame image FB including 32 sub-frame images SF. The memory writing unit 431 writes a background moving image including the pitcher P1 input into the image input unit 411 into the memory 421 at a frequency of 60 Hz for each one frame image FP.

The memory reading unit 440 reads the frame image of the ball written in the memory 420 during the writing operation of the memory writing unit 430 into the memory 420, that is, asynchronously, at 1920 Hz being the second frequency higher than the first frequency. In the present embodiment, the memory reading unit 440 is connected to the cut-out region instruction unit 470. The memory reading unit 440 sequentially cuts out and outputs the images of the ball drawn as sub-frames from one frame of the image of the ball based on the cut-out instruction output from the cut-out region instruction unit 470.

The memory reading unit 441 reads the frame image of the pitcher written in the memory 421 during the writing operation of the memory writing unit 431 into the memory 421, that is, asynchronously, at 1920 Hz. With regard to the frame image of the pitcher, since the frame image is not cut out or the cut-out region thereof remains unchanged, the frame image is substantially a moving image at 60 Hz.

The image processing unit 460 combines the sub-frame image SF of the ball BL read by the memory reading unit 440 with the frame image FP of the background image including the pitcher P1 read by the memory reading unit 441 to output the combination to the image output unit 450.

The image output unit 450 displays an image obtained by combining the background image including the pitcher P1 and the image of the ball BL on the image display unit (not shown).

The cut-out region instruction unit 470 instructs the memory reading unit 440 which sub-frame image SF to cut out from the one frame image FB of the ball BL.

The superimposition position instruction unit 480 instructs the image processing unit 460 on the position of superimposing the sub-frame image SF of the ball BL on the frame image FP of the background moving image including the pitcher P1.

The α value instruction unit 490 designates the region of the ball BL on the sub-frame image SF of the ball BL with the α value indicating the transmittance on the pixel information. Thus, only the image of the ball BL is cut out from the sub-frame image SF and combined with the background moving image by the image processing unit 460. For example, assuming that the region of the ball BL has transmittance of 0% and the other region has transmittance of 100%, only the image of the ball BL can be cut out.

1.2 Criteria for Determining Reading Frequency from Memory

In sports, objects such as balls move at a speed of over 100 km/h. Normally, the frame rate of the moving image output from the image output unit 450 is about the same as the frame rate of the input moving image, which is fps in the present embodiment. There are cases where moving images are displayed at a high frequency in order to increase the apparent frame rate, but in that case, the same image is simply repeatedly displayed, and the image itself does not change. Therefore, when moving images are displayed at a frame rate of 60 fps, the distance traveled by an object moving at 100 km/h in one frame (1/60 second) is 463 mm. This distance is often larger than the size of the object. Therefore, when a moving object is tracked with eyes, the object remains displayed in the same position from when a frame is displayed until when the next frame is displayed. Therefore, an observer shifts his line of sight by predicting the movement of the object in the region where the object on the screen of the image display unit is not displayed. That is, with respect to the movement of the observer's line of sight, the object is displayed with large delay.

It should be noted that the above distance traveled is with respect to the moving direction of the object. When the distance traveled is the moving distance on the screen in the case of the object moving parallel to the screen, and when there is a component perpendicular to the screen, the moving distance on the screen is smaller than 463 mm. Therefore, in the present embodiment, in the system design, the reading frequency is determined in consideration of the condition that the moving distance on the screen is the maximum. In addition, in the case of 3D display using two display devices, since the moving distance in the perceived space is 463 mm, in the present embodiment, the reading frequency from the memory 420 is determined also in consideration of this condition.

In the present embodiment, since the object is displayed at 1920 Hz, the distance traveled in one frame (1/1920 seconds) is 14 mm. This distance is often smaller than the size of the object. Thus, objects are not displayed with delay with respect to the movement of the line of sight.

In addition, when the frequency of the moving image to be output is 60 Hz, the movement of the object is felt intermittently. Furthermore, in the case of baseball, a breaking ball rotates about 60 rps, but the rotation cannot be expressed at 60 fps. However, if the display frequency of the object is set to 1920 Hz as in the present embodiment, not only the movement of the object becomes smooth but also the rotation can be expressed since the object rotates about once with 32 sub-frames.

It should be noted that from the viewpoint of the movement of the object with respect to the movement of the line of sight, a guideline of the frequency at which the delay becomes less conspicuous is considered to be about 500 Hz as in the above embodiments.

1.3 Mode of Reading of Image from Memory and Image Composition

Reading of an image from the memory 420 and image composition will be described with reference to FIGS. 12A to 12J. For the sake of clarity in the example shown in FIGS. 12A to 12J, the number of sub-frames constituting one frame image FB of the ball BL is set to 8. In addition, the frame rate in writing the one frame image FB of the ball BL including eight sub-frames is assumed to be 60 fps, and the frame rate in reading the image of the one sub-frame image FB is assumed to be 480 fps.

As shown in FIG. 12A, it is assumed that sub-frame images SF1 to SF8 for the one frame image FB of the moving image of the ball BL are written in the memory 420. The reading of the sub-frame images SF1 to SF8 is performed for each cut-out region RS according to the size of the sub-frame images SF1 to SF8. In the present embodiment, upon receiving the instruction from the cut-out region instruction unit 470, the memory reading unit 440 switches the cut-out region RS in the order of the sub-frame images SF1 to SF8 as shown in FIGS. 12A to 12E and reads each sub-frame image at a frame rate of 480 fps.

Then, upon receiving the instruction from the superimposition position instruction unit 480, the image processing unit 460 sequentially superimposes the sub-frame images SF1 to SF8 of the moving image of the ball BL on one frame image FP of the background moving image as shown in FIGS. 12F to 12J.

The cut-out region RS of each of the above sub-frame images may be fixed, but may be changed for each sub-frame image. In that case, an instruction may be input from the image generation unit by communication means such as USB or may be superimposed on header information or the like of the moving image.

In addition, the position at which each sub-frame image of the moving image of the ball BL is superimposed may be fixed, but may be changed for each sub-frame image. Also in that case, an instruction may be input from the image generation unit by communication means such as USB or may be superimposed on header information or the like of the moving image.

Incidentally, when the writing frequency of the frame image FB into the memory 420 is 60 Hz and the reading frequency of the sub-frame image SF from the memory 420 is 480 Hz, the reading operation is performed eight times for one frame image FB of the moving image. At the first time of the eight times, the sub-frame image SF may be read from the memory 420 in synchronization with the writing operation of the one frame image FB into the memory 420. In this case, at the remaining seven times, the sub-frame image SF may be read from the memory 420 at time intervals obtained by dividing the time of the one frame image FB into eight equal parts.

2. Operation

The image generation unit (not shown) generates a background moving image including a moving image of the pitcher P1, and outputs a frame image FP of the background moving image to the image display device 400. In addition, the image generation unit generates a moving image of the ball BL and outputs the one frame image FB including 32 sub-frame images to the image display device 400. The image input unit 410 of the image display device 400 inputs a one frame image FB of the ball BL including 32 sub-frame images, and the memory writing unit 430 writes the input one frame image FB into the memory 420 at a frequency of 60 Hz. In addition, the image input unit 411 of the image display device 400 inputs the one frame image FP of the background moving image including the moving image of the pitcher P1, and the memory writing unit 431 writes the input one frame image FP into the memory 421 at a frequency of 60 Hz.

The memory reading unit 440 cuts out at a frequency of 1920 Hz the sub-frame image SF of the cut-out region RS instructed by the cut-out region instruction unit 470 from the one frame image FB written in the memory 420. In addition, the memory reading unit 441 reads the one frame image FP written in the memory 421 at a frequency of 1920 Hz. With regard to the frame image of the pitcher, since the frame image is not cut out or the cut-out region thereof remains unchanged, the frame image is substantially a moving image at 60 Hz.

The image processing unit 460 superimposes the sub-frame image SF of the ball BL in the position designated by the superimposition position instruction unit 480 on the one frame image FP of the background moving image, and only the image of the ball BL is combined with the one frame image FP of the background moving image in response to the instruction from the α value instruction unit 490. The combined image is output from the image output unit 450 and displayed on the image display unit. I In the present embodiment, each of the sub-frame images SF of the ball BL having different diameters and rotation angles is read at 1920 Hz higher than 60 Hz being the writing frequency into the memory 420, and the sub-frame images SF are combined with the background moving image with their respective positions changed. Therefore, from the hand of the pitcher P1 to the position of the batter BT, the image of the ball BL moves smoothly without delay with respect to the movement of the line of sight of the player using the baseball simulator and is displayed with the rotation of the ball BL expressed. As described above, in the present embodiment, the memory reading unit 440 and the image processing unit 460 function as an image interpolation unit that interpolates the image to be output to the image display unit, as indicated by a frame in a dashed line in FIG. 9.

3. Effects and the Like

In the image display device 400 of the present disclosure; the image input unit includes a first image input unit 410 and a second image input unit 411 into which different image signals are input; the memory includes a first memory 420 and a second memory 421; the memory writing unit includes a first memory writing unit 430 for writing an image signal input into the first image input unit 410 into the first memory 420 at 60 Hz as an example of a first frequency, and a second memory writing unit 431 for writing an image signal input into the second image input unit 411 into the second memory 421 at 60 Hz as an example of the first frequency; the memory reading unit includes a first memory reading unit 440 for reading the image signal written in the first memory 420 at 1920 Hz as an example of a second frequency higher than the first frequency, and a second memory reading unit 441 for reading the image signal written in the second memory 421 at 60 Hz as an example of the first frequency; and the image interpolation unit includes an image processing unit 460 for combining the image signal read by the first reading unit 440 and the image signal read by the second reading unit 441. In addition, the image display device 400 of the present disclosure includes an image output unit 450 for outputting the image signal read by the first reading unit 440 and the second reading unit 441 to the image display unit. As a result, for example, in the baseball simulator, it is possible to smoothly move the image of the ball BL without delay with respect to the movement of the line of sight of the player using the baseball simulator, and display the image of the ball BL while expressing the rotation of the ball BL.

4. Modified Example of Third Embodiment 4.1 Overall Configuration

A modified example of the third embodiment will be described with reference to FIGS. 13A to 13I. FIGS. 13A to 13I are diagrams for illustrating the writing of the frame image of the ball into the memory and the reading of the sub-frame image of the ball from the memory in the present modified example. The present modified example differs from the third embodiment in the timing of reading the sub-frame image from the memory 420 with respect to the writing of the frame image into the memory 420.

In the third embodiment, as a memory control, description is made on the premise of a double buffer method. That is, the memory 420 has a capacity for two frames. The present modified example is an example of a case of using a single buffer method. In the case of the double buffer method, since the reading of the sub-frame image SF is not started until the writing of the frame image FB of the ball BL into the memory 420 is completed, a delay occurs from the writing of the frame image FB to the display. Therefore, in the present modified example, in order to minimize this delay, reading of the sub-frame image SF is started when the necessary frame image FB is written into the memory 420.

Figures 13A, 13B, 13C, 13D, 13E, 13F, 13G, 13H, 13I:
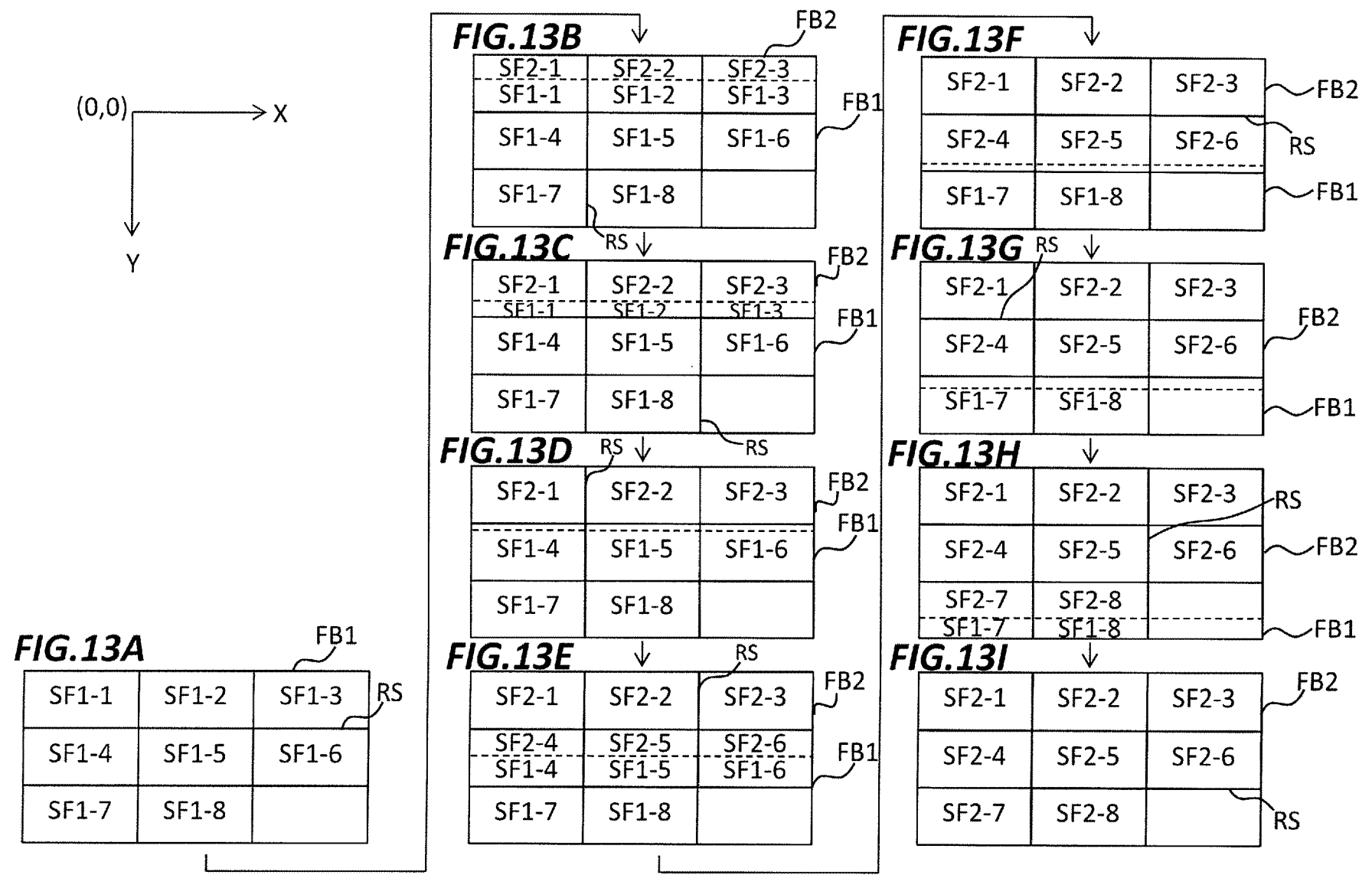

As described above, the information on the frame image FB of the memory 420 is rewritten in order from the top to the bottom. FIG. 13A shows a state in which the writing of the sub-frame images SF1-1 to SF1-8 of the first frame image FB1 is completed. From this state, as shown in FIGS. 13B and 13C, from the region where the sub-frame images SF1-1, SF1-2, and SF1-3 of the first frame image FB1 are written, the information on the sub-frame images SF1-1, SF1-2, and SF1-3 of the first frame image FB1 is rewritten into the information on the sub-frame images SF2-1, SF2-2, and SF2-3 of the second frame image FB2. The boundary line shown with a dotted line in FIGS. 13B to 13H indicates the boundary between the region into which the information on the sub-frame images of the first frame image FB1 is already written and the region into which the information on the sub-frame images of the second frame image FB2 is newly rewritten.

When the rewriting of the sub-frame images SF2-1, SF2-2, and SF2-3 is completed, subsequently, as shown in FIGS. 13D and 13E, the rewriting from the information on the sub-frames SF1-4, SF1-5, and SF1-6 of the frame image FB1 into the sub-frame images SF2-4, SF2-5, and SF2-6 of the frame image FB2 is started. Since the information on the sub-frame image SF2-1 is already rewritten at this time, as shown in FIG. 13D, the reading of the region of the sub-frame image SF2-1 is started as a cut-out region RS. Thereafter, as shown in FIGS. 13E and 13F, the sub-frame images SF2-2 and SF2-3 are read. At the timings shown in FIGS. 13G, 13H, and 13I, since the rewriting into the information on the sub-frame images SF2-4, SF2-5, and SF2-6 of the frame image FB2 is completed, subsequently, the reading of the region of the sub-frame images SF2-4, SF2-5, and SF2-6 is started as a cut-out region RS. FIG. 13I shows a state in which the writing of the frame image FB2 is completed.

According to the above procedure, the timing can be controlled so that the rewriting line of the frame image in the memory 420 does not overlap the read image, so that even when the rewriting into information on all the frame images is not completed, the reading of necessary sub-frame images can be performed. More specifically, since the sub-frame images are combined over 3 rows (×3 columns), the reading of the sub-frame image FB2-1 only has to be started after a period of ⅓ of one frame period (1/60 second) elapses from the start of rewriting from the frame image FB1 into the frame image FB2. More generally, in the case of dividing the sub-frame image into M rows×N columns, the reading only has to be started after only 1/M of one frame period elapses.

4.2 Effects and the Like

As described above, according to the present modified example, using a memory of a single buffer allows the delay from the writing of the frame image into the memory to the reading of the sub-frame image to be minimized.

5. Another Modified Example of Third Embodiment 5.1 Overall Configuration

Figure 14:
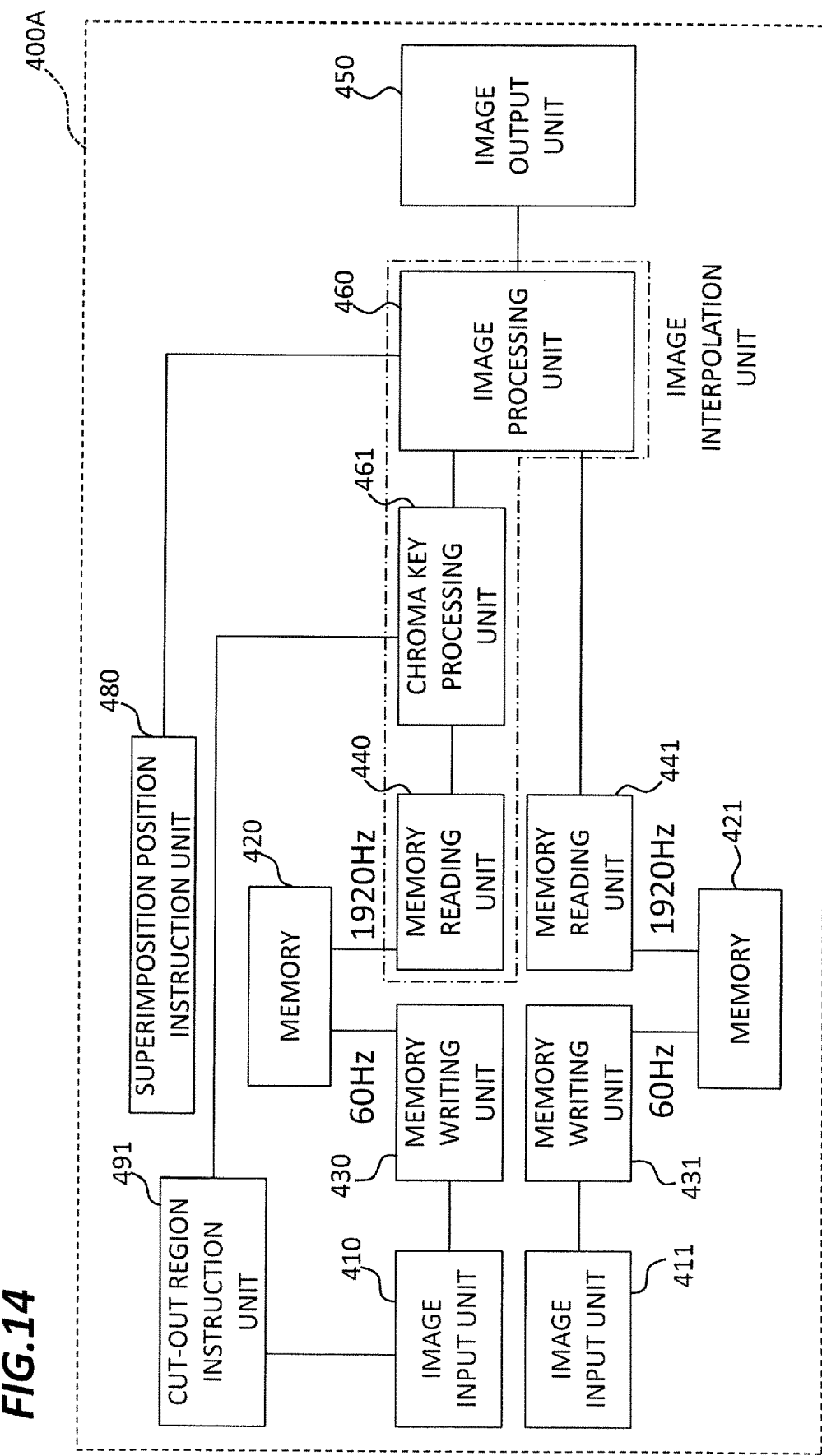
FIG. 14 is a block diagram showing an image display device according to a modified example of the third embodiment.

Another modified example of the third embodiment will be described with reference to FIG. 14. FIG. 14 is a block diagram showing an image display device according to another modified example of the third embodiment. The third embodiment includes the cut-out region instruction unit 470 and the α value instruction unit 490, and the α value is designated in the sub-frame image cut out as the cut-out region, so that the image of the ball BL is cut out. In the present modified example, as shown in FIG. 14, the image display device 400A includes a chroma key color instruction unit 491 and a chroma key processing unit 461, and uses the chroma key processing to cut out an image of the ball BL.

The chroma key color instruction unit 491 instructs the image input unit 410 to uniformly fill the periphery of the image of the ball BL of the sub-frame images SF constituting the one frame image FB of the ball BL input into the image input unit 410 with the designated color. As a result, in each sub-frame image SF written into the memory 420 by the memory writing unit 430, the periphery of the ball image is uniformly filled with the color designated by the chroma key color instruction unit 491. It should be noted that for the chroma key color, a color which is not used for the ball image is generally selected.

The chroma key processing unit 461 performs processing of transmitting the chroma key color portion designated from the chroma key color instruction unit 491 and cutting out the image of the ball BL on the sub-frame image SF read by the memory reading unit 440.

5.2 Operation

The image generation unit (not shown) generates a background moving image including a moving image of the pitcher P1, and outputs a frame image FP of the background moving image to the image display device 400A. In addition, the image generation unit generates a moving image of the ball BL and outputs the one frame image FB including 32 sub-frame images to the image display device 400A. The image input unit 410 of the image display device 400A inputs a one frame image FB of the ball BL including 32 sub-frame images.

The memory writing unit 430 writes the one frame image FB in which the periphery of the image of the ball BL is uniformly filled with the designated color into the memory 420 at a frequency of 60 Hz. In addition, the image input unit 411 of the image display device 400A inputs the one frame image FP of the background moving image including the moving image of the pitcher P1, and the memory writing unit 431 writes the input one frame image FP into the memory 421 at a frequency of 60 Hz.

The memory reading unit 440 reads the sub-frame images SF at a frequency of 1920 Hz from the one frame image FB written in the memory 420. In addition, the memory reading unit 441 reads the one frame image FP written in the memory 421 at a frequency of 1920 Hz. With regard to the frame image of the pitcher, since the frame image is not cut out or the cut-out region thereof remains unchanged, the frame image is substantially a moving image at 60 Hz.

The chroma key processing unit 461 transmits the chroma key color portion designated from the chroma key color instruction unit 491 and cuts out the image of the ball BL on the sub-frame image SF read by the memory reading unit 440.

The image processing unit 460 superimposes the image of the ball BL cut out by the chroma key processing unit 461 in the position designated by the superimposition position instruction unit 480 on the one frame image FP of the background moving image and the image of the ball BL is combined with the one frame image FP of the background moving image. The combined image is output from the image output unit 450 and displayed on the image display unit. In the present embodiment, each of the sub-frame images SF of the ball BL having different diameters and rotation angles is read at 1920 Hz higher than 60 Hz being the writing frequency into the memory 420, and the sub-frame images SF are combined with the background moving image with their respective positions changed. Therefore, from the hand of the pitcher P1 to the position of the batter BT, the image of the ball BL moves smoothly without delay with respect to the movement of the line of sight of the player using the baseball simulator and is displayed with the rotation of the ball BL expressed. As described above, in the present embodiment, the memory reading unit 440, the chroma key processing unit 461, and the image processing unit 460 function as an image interpolation unit that interpolates the image to be output to the image display unit, as indicated by a frame in a dashed line in FIG. 14.

5.3 Effects and the Like

As described above, according to the present modified example, in the baseball simulator, it is possible to smoothly move the image of the ball BL without delay with respect to the movement of the line of sight of the player using the baseball simulator, and display the image of the ball BL while expressing the rotation of the ball BL.

6. Another Modified Example of Third Embodiment 6.1 Overall Configuration

Figure 15:
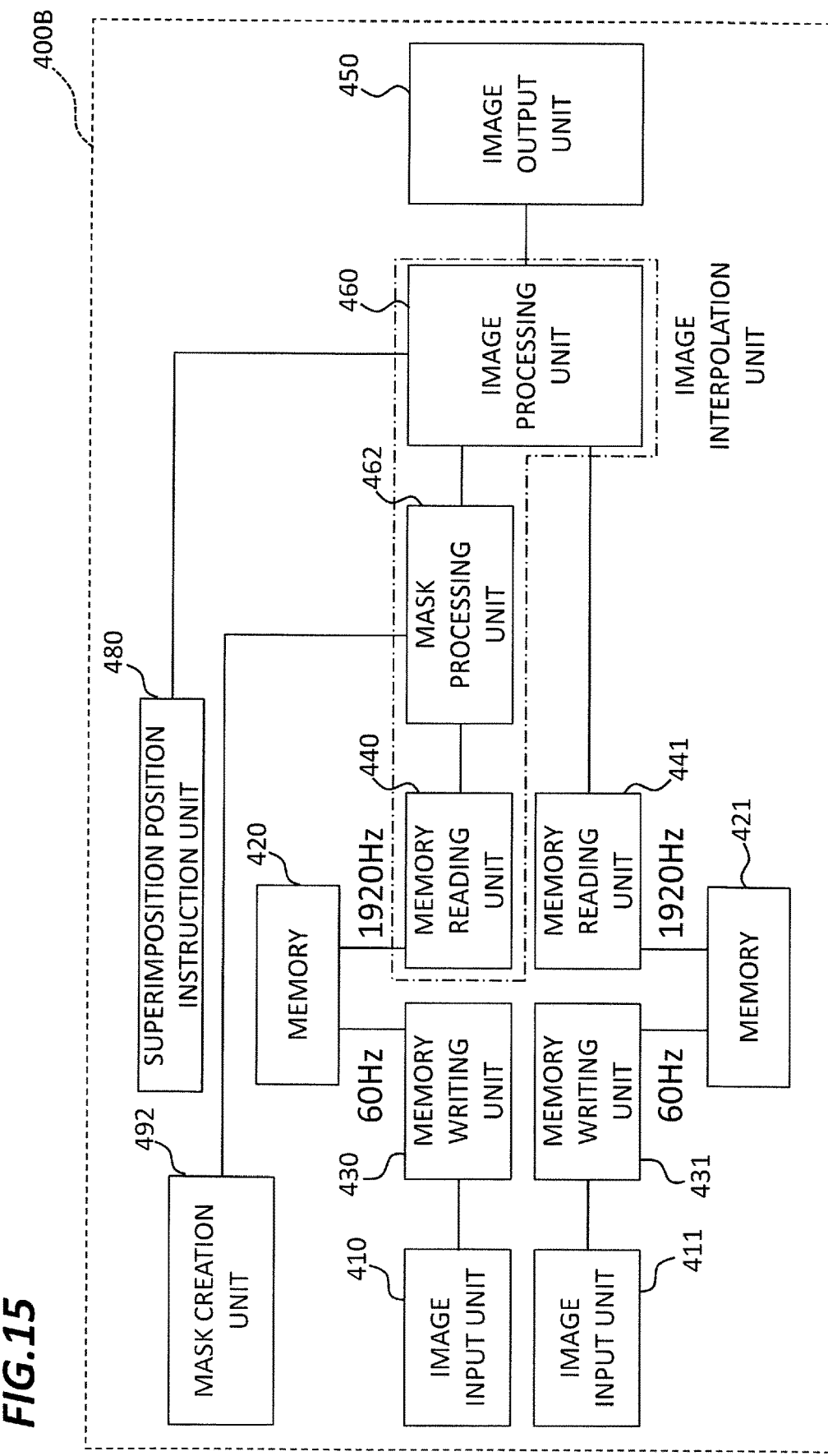
FIG. 15 is a block diagram showing an image display device according to a modified example of the third embodiment.

Still another modified example of the third embodiment will be described with reference to FIG. 15. FIG. 15 is a block diagram showing an image display device according to another modified example of the third embodiment. The third embodiment includes the cut-out region instruction unit 470 and the α value instruction unit 490, and the α value is designated in the sub-frame image cut out as the cut-out region, so that the image of the ball BL is cut out. In the present modified example, as shown in FIG. 15, the image display device 400B includes a mask creation unit 492 and a mask processing unit 462, and uses the mask processing to cut out an image of the ball BL.

The mask processing unit 462 calculates the pixel-value product of each pixel value of the sub-frame image SF read by the memory reading unit 440 and the binary image created by the mask creation unit 492, and performs processing of cutting out the image of the ball BL. The mask processing unit 462 calculates the pixel-value product of each pixel value of the sub-frame image SF read by the memory reading unit 440 and the binary image created by the mask creation unit 492, and performs processing of cutting out the image of the ball BL.

6.2 Operation

The image generation unit (not shown) generates a background moving image including a moving image of the pitcher P1, and outputs a frame image FP of the background moving image to the image display device 400B. In addition, the image generation unit generates a moving image of the ball BL and outputs the one frame image FB including 32 sub-frame images to the image display device 400B. The image input unit 410 of the image display device 400B inputs a one frame image FB of the ball BL including 32 sub-frame images.

The memory writing unit 430 writes the one frame image FB of the ball BL into the memory 420 at a frequency of 60 Hz. In addition, the image input unit 411 of the image display device 400B inputs the one frame image FP of the background moving image including the moving image of the pitcher P1, and the memory writing unit 431 writes the input one frame image FP into the memory 421 at a frequency of 60 Hz.

The memory reading unit 440 reads the sub-frame images SF at a frequency of 1920 Hz from the one frame image FB written in the memory 420. In addition, the memory reading unit 441 reads the one frame image FP written in the memory 421 at a frequency of 1920 Hz. With regard to the frame image of the pitcher, since the frame image is not cut out or the cut-out region thereof remains unchanged, the frame image is substantially a moving image at 60 Hz.

The mask creation unit 492 creates a binary image in which the region of the ball BL is set to 1 and the other region is set to 0. The mask processing unit 462 calculates the pixel-value product of each pixel value of the sub-frame image SF read by the memory reading unit 440 and the binary image created by the mask creation unit 492, and performs processing of cutting out the image of the ball BL.

The image processing unit 460 superimposes the image of the ball BL cut out by the mask processing unit 462 in the position designated by the superimposition position instruction unit 480 on the one frame image FP of the background moving image and the image of the ball BL is combined with the one frame image FP of the background moving image. The combined image is output from the image output unit 450 and displayed on the image display unit. In the present embodiment, each of the sub-frame images SF of the ball BL having different diameters and rotation angles is read at 1920 Hz higher than 60 Hz being the writing frequency into the memory 420, and the sub-frame images SF are combined with the background moving image with their respective positions changed. Therefore, from the hand of the pitcher P1 to the position of the batter BT, the image of the ball BL moves smoothly without delay with respect to the movement of the line of sight of the player using the baseball simulator and is displayed with the rotation of the ball BL expressed. As described above, in the present embodiment, the memory reading unit 440, the mask processing unit 462, and the image processing unit 460 function as an image interpolation unit that interpolates the image to be output to the image display unit, as indicated by a frame in a dashed line in FIG. 15.

6.3 Effects and the Like

As described above, according to the present modified example, in the baseball simulator, it is possible to smoothly move the image of the ball BL without delay with respect to the movement of the line of sight of the player using the baseball simulator, and display the image of the ball BL while expressing the rotation of the ball BL.

Figure 16:
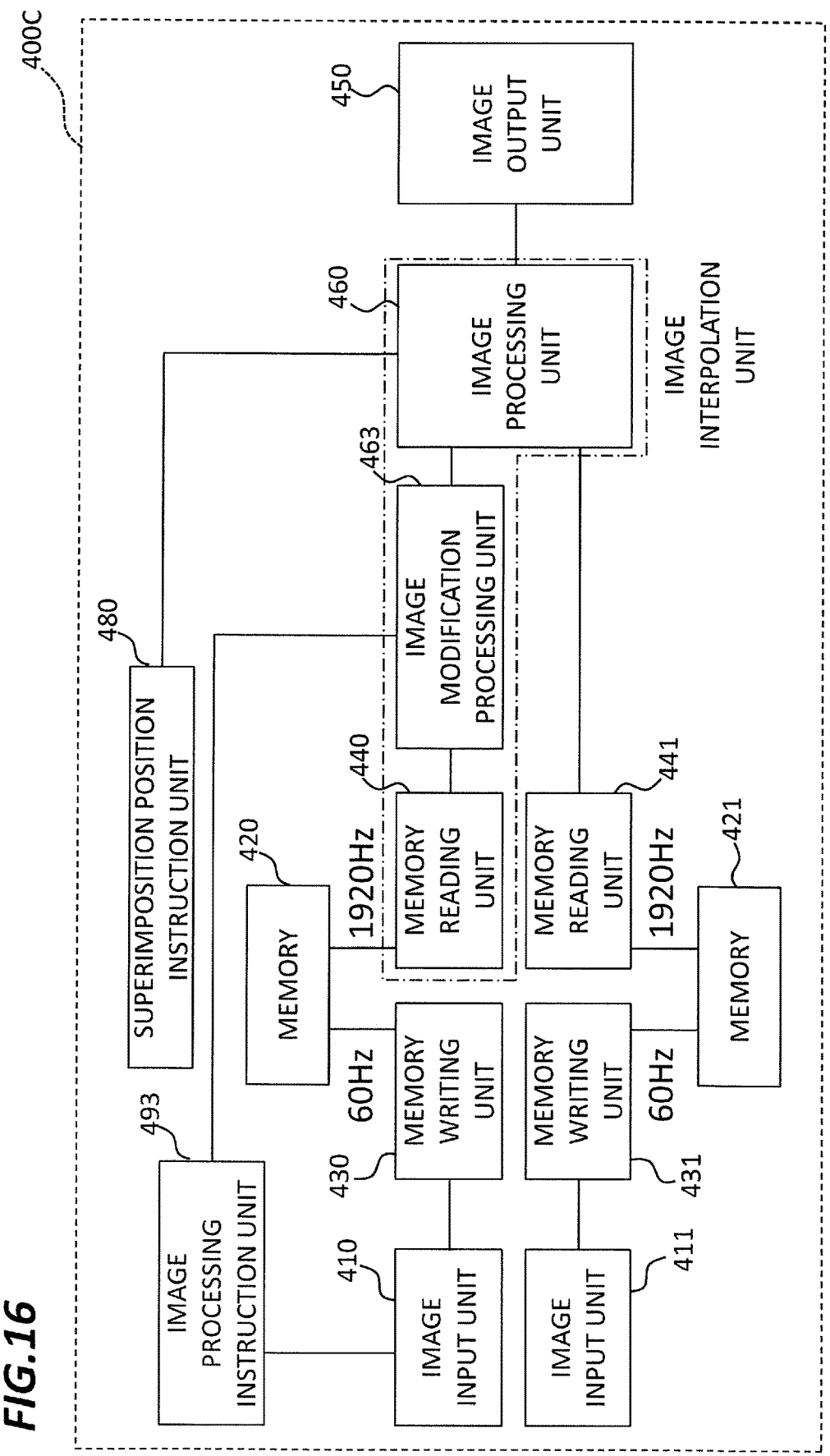
FIG. 16 is a block diagram showing an image display device according to a modified example of the third embodiment.

It should be noted that in addition to cut-out processing, chroma key processing, and mask processing, various kinds of processing such as shape modification and Warp processing can be considered for modification processing of cutting out the image of the ball BL. FIG. 16 is a block diagram of an image display device 400C having these various image modification processing functions. In general, as shown in FIG. 16, the image display device 400C only has to include an image processing instruction unit 493 and an image modification processing unit 463 and only has to perform modification processing for cutting out the image of the ball BL, such as shape modification or Warp processing, other than cut-out processing, chroma key processing, or mask processing. In this case, the memory reading unit 440, the image modification processing unit 463, and the image processing unit 460 function as an image interpolation unit.

7. Another Modified Example of Third Embodiment 7.1 Overall Configuration

Figure 17:
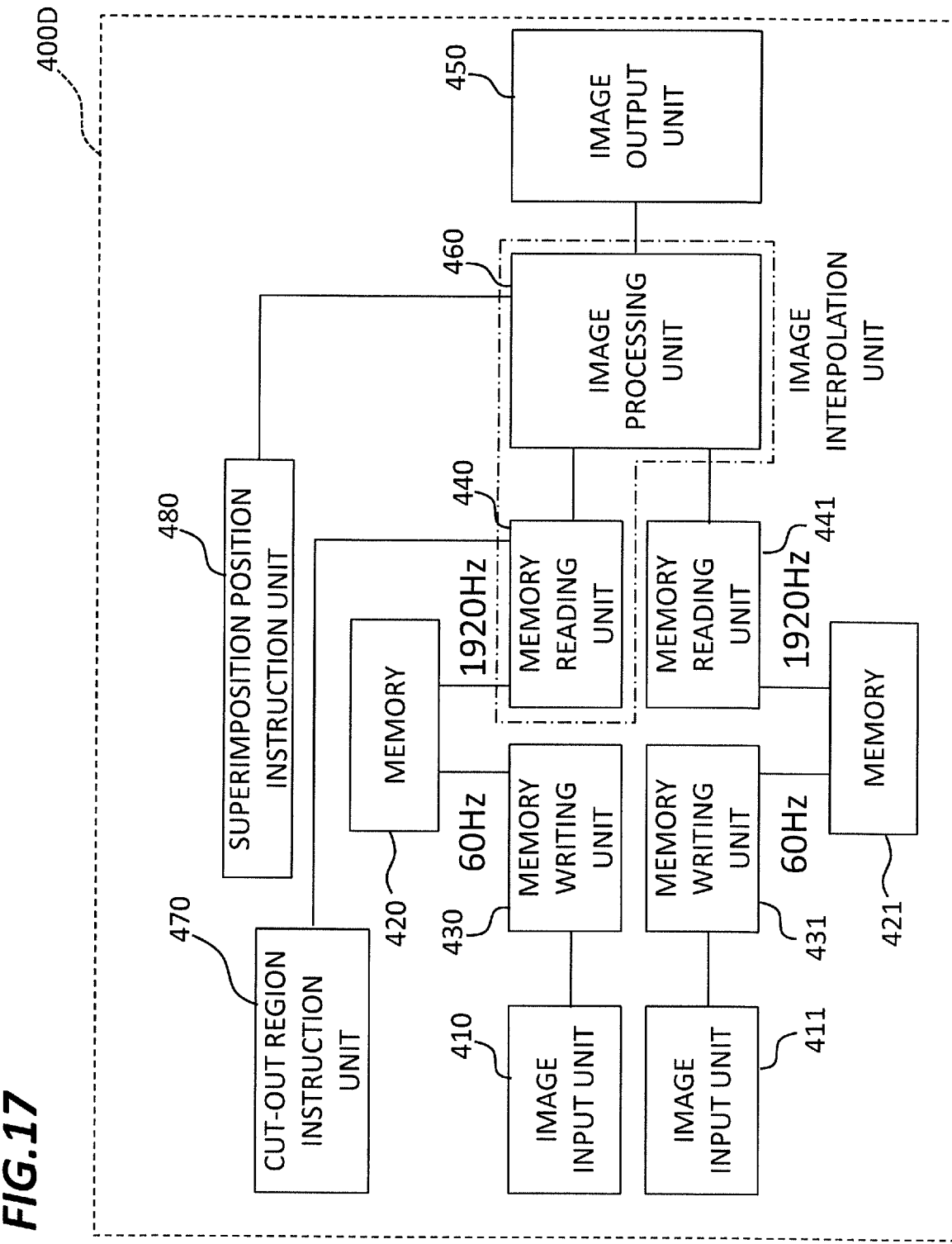
FIG. 17 is a block diagram showing an image display device according to a modified example of the third embodiment.
Figure 18:
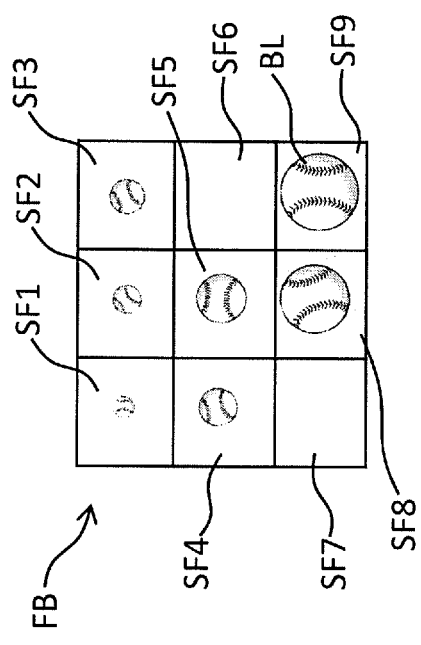
FIG. 18 is a diagram showing sub-frame images of a moving image of a ball in a modified example of the third embodiment.

Still another modified example of the third embodiment will be described with reference to FIGS. 17 and 18. FIG. 17 is a block diagram of the image display device in the present modified example. FIG. 18 is a diagram showing sub-frame images of a moving image of a ball in the present modified example. The present modified example is an application example of the third embodiment, and the image display device of the present disclosure is applied to a system that trains prediction ability by not displaying objects of a specific sub-frame.

As shown in FIG. 17, the image display device 400D of the present modified example does not include the α value instruction unit 490 as compared with the image display device 400 of the third embodiment. In the present modified example, the frame image FB illustrated in FIG. 18 is used as the frame image FB of the ball BL.

In the example shown in FIG. 18, the sub-frame image SF6 and the sub-frame image SF7 of the nine sub-frame images SF of a certain frame image FB do not include the ball BL. By using this frame image FB, in the composite image displayed on the image display unit, the ball BL is not displayed at the display timing of the sub-frame image SF6 and the sub-frame image SF7. Thus, since a user of the system cannot see the ball for a moment, the user needs to predict the following locus.

7.2 Effects and the Like

As described above, according to the present modified example, in the baseball simulator, it is possible to smoothly move the image of the ball BL without delay with respect to the movement of the line of sight of the player using the baseball simulator, and display the image of the ball BL while expressing the rotation of the ball BL.

As described above, according to the present disclosure, in a system such as a simulator, even when it is necessary to perform display at a frame rate higher than the frame rate of the input moving image, it is possible to reduce the delay from the input to the display of the moving image and to perform smooth display. In addition, it is possible to reduce the delay from the operation of the controller to the display of the moving image corresponding to the operation. Furthermore, it is possible to reduce the display delay of the object with respect to the movement of the eyes and to perform smooth display.

Other Embodiments

As described above, the first to third embodiments are described as examples of the technique disclosed in the present application. However, the technique in the present disclosure is not limited to this, and can also be applied to embodiments in which changes, substitutions, additions, omissions, and the like are made as appropriate. In addition, it is also possible to combine the respective components described in the first embodiment, the second embodiment, the third embodiment, and the respective modified examples into a new embodiment. Thus, in the following, other embodiments will be exemplified.

In the first embodiment described above, the mode of using only one image display device of the present disclosure is described, but for example, even in the mode of using two image display devices to perform 3D display, the image display device according to the present disclosure can be applied.

In the above-described second embodiment, the mode in which the image display device of the present disclosure is applied to a driving simulator or a flight simulator is described, but for example, the image display device can be widely used as a simulator of moving means involving piloting or operation such as a simulator of a yacht, a canoe, a boat, or a ship, or a simulator of a bobsled, luge, or the like.

In the above-described third embodiment, a mode in which the image display device of the present disclosure is applied to a baseball simulator is described, but for example, the image display device can also be applied to training devices for various ball games such as golf, soccer, and hockey. In addition, besides the ball game, the image display device of the present disclosure can also be applied to a training device such as shooting.

As described above, the embodiments are described as the exemplification of the technique in the present disclosure. For that, the accompanying drawings and the detailed description have been provided. Therefore, among the components described in the accompanying drawings and the detailed description, not only the components essential for solving the problem, but also the component not essential for solving the problem may be included in order to exemplify the above technique. Therefore, it should not be recognized that these non-essential components are essential immediately because these non-essential components are described in the accompanying drawings and the detailed description.

In addition, since the above embodiments are for illustrating the technique in the present disclosure, various changes, substitutions, additions, omissions, and the like can be made within the scope of the claims or the equivalent thereof.

The present disclosure can be applied to an image display device such as a projector. Specifically, the present disclosure can be applied to a device for displaying a panoramic image, a driving simulator or a flight simulator, a simulator for training various sports, and the like.

REFERENCE NUMBERS

1 IMAGE DISPLAY SYSTEM
100 CONTROLLER
200 IMAGE GENERATION UNIT
300 IMAGE DISPLAY DEVICE
310 IMAGE INPUT UNIT
320 MEMORY
330 MEMORY WRITING UNIT
340 MEMORY READING UNIT
350 IMAGE OUTPUT UNIT
400 IMAGE DISPLAY DEVICE
410 IMAGE INPUT UNIT
411 IMAGE INPUT UNIT
420 MEMORY
421 MEMORY
430 MEMORY WRITING UNIT
431 MEMORY WRITING UNIT
440 MEMORY READING UNIT
441 MEMORY READING UNIT
450 IMAGE OUTPUT UNIT
460 IMAGE PROCESSING UNIT

The invention claimed is:

1. An image display device comprising:
an image input unit into which an image signal from an image signal source is input;
a memory;
a writing unit configured to write at a first frequency an image signal input into the image input unit into the memory;
a reading unit configured to read at a second frequency higher than the first frequency an image signal written in the memory;
an image output unit configured to output an image signal read by the reading unit to a display unit; and
an image interpolation unit configured to interpolate an image to be output to the display unit,
wherein the image input unit includes a first image input unit and a second image input unit, different image signals being input into the first image input unit and the second image input unit,
wherein the memory includes a first memory and a second memory,
wherein the writing unit includes:
a first writing unit configured to write at the first frequency an image signal input into the first image input unit into the first memory; and
a second writing unit configured to write at the first frequency an image signal input into the second image input unit into the second memory,
wherein the reading unit includes:
a first reading unit configured to read at the second frequency higher than the first frequency an image signal written in the first memory; and
a second reading unit configured to read at the second frequency an image signal written in the second memory, and
wherein the image interpolation unit includes an image processing unit configured to combine an image signal read by the first reading unit and an image signal read by the second reading unit.

2. The image display device according to claim 1,
wherein the memory is a single buffer, and
wherein the reading unit reads an image signal written in the memory in synchronization with a writing operation by the writing unit.

3. The image display device according to claim 1,
wherein the memory is a double buffer, and
wherein the reading unit reads an image signal written in the memory asynchronously with a writing operation by the writing unit.

4. The image display device according to claim 1,
further comprising a cut-out region instruction unit configured to instruct a region to be read as a cut-out region of an image signal written in the memory,
wherein the cut-out region instruction unit is configured to change a position of the cut-out region.

5. The image display device according to claim 1, wherein the image interpolation unit includes an image processing unit configured to perform image processing including distortion correction of a panoramic image or a full 360-degree spherical image.

6. The image display device according to claim 1,
further comprising a controller,
wherein the reading unit reads an image signal written in the memory for each region depending on an operation of the controller.

7. The image display device according to claim 1, wherein the image signal input into the first image input unit includes a plurality of sub-frames.

8. The image display device according to claim 7, wherein the image interpolation unit includes an image processing instruction unit and an image modification processing unit configured to cut out a specific image from the sub-frame.

* * * * *